US011057317B2

(12) United States Patent
Elizabeth et al.

(10) Patent No.: US 11,057,317 B2
(45) Date of Patent: Jul. 6, 2021

(54) SYNCHRONIZING MULTICAST ROUTER CAPABILITY TOWARDS ETHERNET VIRTUAL PRIVATE NETWORK (EVPN) MULTI-HOMED PROTOCOL INDEPENDENT MULTICAST (PIM) DEVICE

(71) Applicant: Juniper Networks, Inc., Sunnyvale, CA (US)

(72) Inventors: Princy T. Elizabeth, Bangalore (IN); Himanshu Agarwal, Bangalore (IN); Vikram Nagarajan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 41 days.

(21) Appl. No.: 16/584,536

(22) Filed: Sep. 26, 2019

(65) Prior Publication Data
US 2021/0099400 A1    Apr. 1, 2021

(51) Int. Cl.
*H04L 12/00* (2006.01)
*H04L 12/931* (2013.01)
(Continued)

(52) U.S. Cl.
CPC ........ *H04L 49/208* (2013.01); *H04L 12/4641* (2013.01); *H04L 49/201* (2013.01); *H04L 69/14* (2013.01); *H04L 45/50* (2013.01)

(58) Field of Classification Search
CPC . H04L 49/208; H04L 12/4641; H04L 49/201; H04L 69/14; H04L 45/50
See application file for complete search history.

(56) References Cited

U.S. PATENT DOCUMENTS 9,397,931 B1 *  7/2016  Mohanty ................. H04L 45/48
9,838,310 B1 * 12/2017  Sajassi ................ H04L 61/6022
(Continued)

FOREIGN PATENT DOCUMENTS

EP    3 276 895 A1    1/2018
EP    3 367 619 A1    8/2018

OTHER PUBLICATIONS

NPL—"EVPN Type 7/8 (IGMP Join/Leave Synch Routes) Explained," downloaded on Aug. 19, 2019 from http://www.bgphelp.com/2017/06/04/evpn-type-78-igmp-joinleave-synch-routes-explained/, pp. 1-5 (Year: 2017).*

(Continued)

*Primary Examiner* — Lan-Huong Truong
(74) *Attorney, Agent, or Firm* — John C. Pokotylo; Pokotylo Patent Services

(57) ABSTRACT

Port synchronization is provided for multicast on an Ethernet segment (ES) in which a device (CE) is multihomed to at least two devices (PE1 and PE2) of a VLAN. Such example embodiments may do so by providing computer-implemented method for use in a first device belonging to an Ethernet virtual private network (EVPN) and an Ethernet segment (ES), the ES including a second device and a third device, the second device also belonging to the EVPN, the third device being multihomed to the first device and the second device via the ES, and the first and second devices having snooping enabled for multicast group messages, the computer-implemented method comprising: (a) detecting, on a first interface of the first device, from the third device via the ES, a multicast query message, wherein the multicast query message is not detected by the second device via the ES; (b) marking the first interface of the first device as a multicast router port; (c) generating a message identifying the ES and including information encoding that the multicast query message was detected on the ES; and (d) sending, via (Continued)

the EVPN, the message generated to the second device so that the second device will mark an interface, on the ES, with the third device, as a multicast router port.

20 Claims, 17 Drawing Sheets

(51) Int. Cl.
*H04L 29/06* (2006.01)
*H04L 12/46* (2006.01)
*H04L 12/723* (2013.01)

(56) References Cited

U.S. PATENT DOCUMENTS

| | | | |
|---|---|---|---|
| 2016/0006646 A1* | 1/2016 | Lin | H04L 12/6418 370/390 |
| 2016/0134528 A1* | 5/2016 | Lin | H04L 45/66 709/238 |
| 2016/0378606 A1* | 12/2016 | Sajassi | G06F 11/1423 714/4.2 |
| 2017/0373973 A1* | 12/2017 | Bickhart | H04L 45/741 |
| 2018/0034648 A1* | 2/2018 | Nagarajan | H04L 69/325 |

OTHER PUBLICATIONS

"EVPN Multihoming Overview," downloaded on Oct. 9, 2019 from https://www.juniper.net/documentation/en_US/junos/topics/concept/evpn-bgp-multihoming-overview.html, pp. 1-30 (Juniper Networks TechLibrary, Feb. 19, 2019).

"IGMP Snooping Overview," downloaded on Oct. 9, 2019 from https://www.juniper.net/documentation/en_US/junos/topics/concept/igmp-snooping-qfx-series-overview.html, pp. 1-9 (Juniper Networks TechLibrary, Sep. 11, 2019).

"Overview of Multicast Forwarding with IGMP or MLD Snooping in an EVPN-MPLS Environment," downloaded on Oct. 9, 2019 from https://www.juniper.net/documentation/en_US/junos/topics/concept/evpn-mpls-igmp-snooping-overview.html, pp. 1-9 (Juniper Networks TechLibrary, Sep. 23, 2019).

"EVPN Type 7/8 (IGMP Join/Leave Synch Routes) Explained," downloaded on_Aug. 19, 2019 from http://www.bgphelp.com/2017/06/04/evpn-type-78-igmp-joinleave-synch-routes-explained/, pp. 1-5.

A. Sajassi, et al, "IGMP and MLD Proxy for EVPN," draft-ietf-bess-evpn-igmp-mld-proxy-03 from https://tools.ietf.org/html/draft-ietf-bess-evpn-igmp-mld-proxy-03, pp. 1-31 (Internet Engineering Task Force, Jun. 10, 2019).

Extended European Search Report to corresponding European Patent Application No. 19213049.0-1216, dated Apr. 30, 2020 (6 pgs.).

* cited by examiner

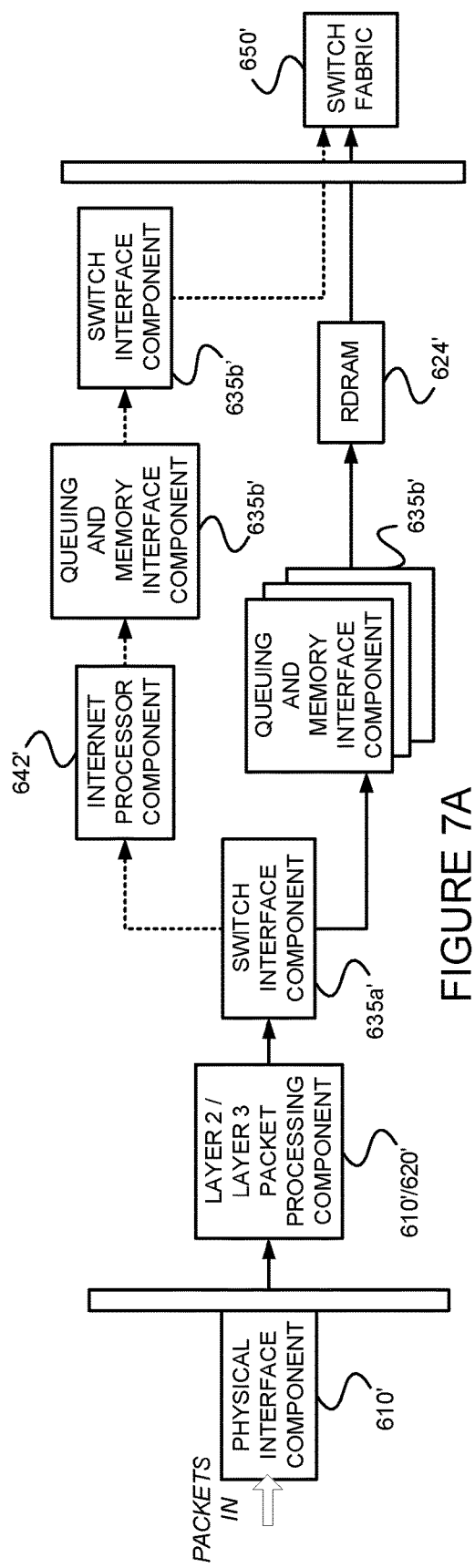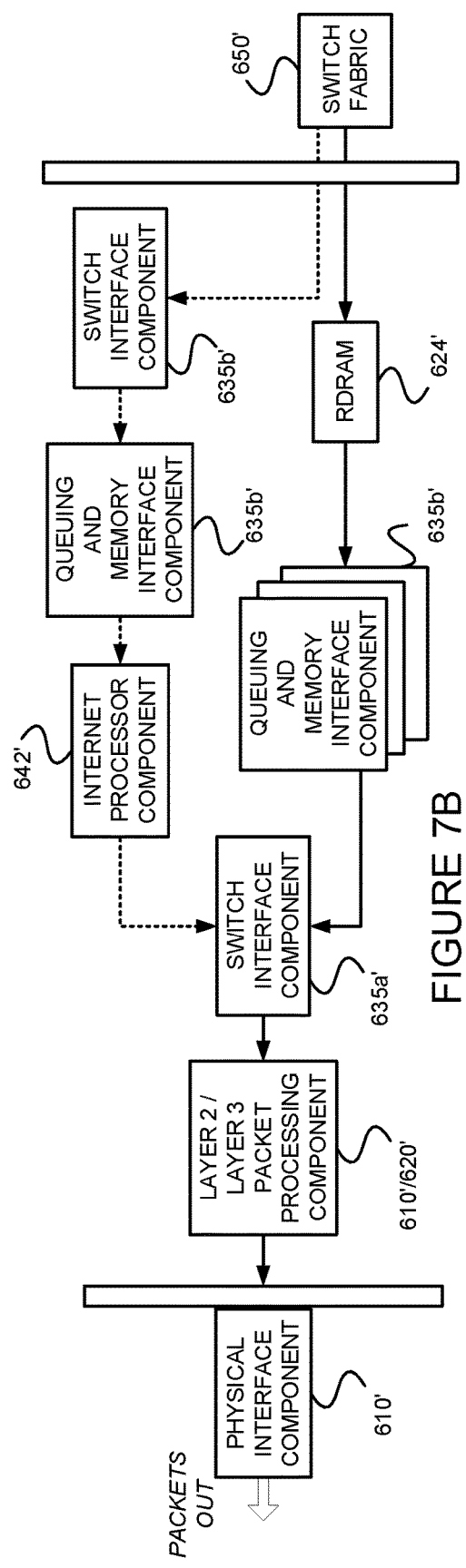
FIGURE 7A
FIGURE 7B

SYNCHRONIZING MULTICAST ROUTER CAPABILITY TOWARDS ETHERNET VIRTUAL PRIVATE NETWORK (EVPN) MULTI-HOMED PROTOCOL INDEPENDENT MULTICAST (PIM) DEVICE

§ 1. BACKGROUND OF THE INVENTION

§ 1.1 Technical Field

The present description concerns communications networks. More specifically, the present description concerns multicasting in Ethernet virtual private networks (EVPNs) in which Internet Group Management Protocol (IGMP) snooping is enabled, as well as multihomed access to such EVPNs.

§ 1.2 Background Information

The present description concerns problems that arise in multi-homed access to EVPNs when IGMP snooping is used. Although EVPNs, EVPN multihoming, the IGMP, and IGMP snooping are well understood by those having ordinary skill in the art, each is introduced for the reader's convenience.

§ 1.2.1 EVPNs

An EVPN enables the connection of dispersed customer sites using a Layer 2 virtual bridge. As with other types of VPNs, an EVPN typically includes customer edge devices (CEs) (e.g., host devices, routers, and/or switches) connected to provider edge devices (PEs), such as routers for example. The PEs can include a multiprotocol label switching (MPLS) edge switch (MES) that acts at the edge of MPLS infrastructure defining the EVPN domain. Multiple EVPNs can be deployed within a service provider network, each providing network connectivity to a customer while ensuring that the traffic sharing on that network remains private.

FIG. 1 illustrates an example EVPN deployment. Traffic from CE1 is transported over the service provider's network to CE2. CE1 is multihomed to the EVPN via PE1 and PE2. The PEs within the EVPN are interconnected using label-switched paths (LSPs). Within the EVPN, learning between PEs occurs in the control plane (using, for example, the border gateway protocol (BGP)) rather than in the data plane (as is the case with traditional network bridging). The control plane provides greater control over the learning process, allowing which devices discover information about the network to be restricted. Policies may be provided on the PEs to control how network information is distributed and processed. EVPNs utilize the BGP control plane infrastructure, providing greater scale and the ability to isolate groups of devices (hosts, servers, virtual machines, and so on) from each other.

The PEs attach an MPLS label to each layer 2 (e.g., MAC) address learned from the CEs. This label and MAC address combination is advertised to the other PEs in the control plane. Control plane learning enables load balancing and improves convergence times in the event of certain types of network failures. The learning process between the PEs and the CEs may be completed using the method best suited to each CE (e.g., data plane learning, IEEE 802.1, LLDP, 802.1aq, and so on).

A CE attaches to an EVPN routing instance on a PE through an Ethernet interface that might be configured for one or more VLANs.

So, in summary, an EVPN includes customer edge devices (CEs) that are connected to provider edge devices (PEs), which form the edge of the MPLS infrastructure. A CE can be a host, a router, or a switch. The PEs provide Layer 2 virtual bridge connectivity between the CEs. There can be multiple EVPNs in the provider network. Learning between the PEs occurs in the control plane using BGP, unlike traditional bridging, where learning occurs in the data plane.

§ 1.2.2 Multihoming to an EVPN

The EVPN multihoming feature enables a customer site to be connected with two or more PEs to provide redundant (and/or load balanced) connectivity. A CE can be multihomed to different PEs or the same PE. A redundant PE can provide network service to the customer site as soon as a failure is detected. Thus, EVPN multihoming helps to maintain EVPN service and traffic forwarding to and from the multihomed site in the event of network failures such as, for example, PE to CE link failure, PE failure, MPLS-reachability failure between a local PE and a remote PE, etc.

Recall from FIG. 1 that CE1 is multihomed to PE1 and PE2. In this way, CE2 has (at least) two potential paths to reach CE1. Depending on the multihoming mode of redundancy (described later), only one path or both the paths (or all paths if there are more than two) are active at any time. The multihoming mode of operation also determines a designated forwarder (DF) PE(s) for forward traffic to the CE. The DF PE may use MPLS LSP or GRE tunnels to forward traffic. If a failure occurs over this path, a new DF PE is elected to forward the traffic to CE1.

Certain EVPN multihoming concepts are now defined with reference to FIG. 1.

When a CE is multihomed to two or more PEs, the set of Ethernet links constitutes an Ethernet segment (ES). An Ethernet segment appears as a link aggregation group (LAG) to the CE. Referring to FIG. 1, the links from PE1 and PE2 to CE1 form an Ethernet segment. In active-standby multihoming, the links that constitute an Ethernet segment form a bridge domain. In active-active multihoming, an Ethernet segment appears as a LAG to the CE.

An Ethernet segment must have a unique, nonzero identifier, called the Ethernet segment identifier (ESI). The ESI is encoded as a 10-octet integer. When manually configuring an ESI value, the most significant octet, known as the type byte, must be 00. When a single-homed CE is attached to an Ethernet segment, the entire ESI value is zero. Referring to FIG. 1, the Ethernet segment of multihomed CE1 has an ESI value of 00:11:22:33:44:55:66:77:88:99 assigned. Single-homed CE2 has an ESI value of 0.

An EVPN instance (EVI) is an EVPN routing and forwarding instance spanning all the PEs participating in that VPN. An EVI may be configured on the PEs on a per-customer basis. Each EVI has a unique route distinguisher and one or more route targets. Referring to FIG. 1, an EVI is configured on Routers PE1, PE2, and PE3.

An Ethernet tag identifies a particular broadcast domain, such as a VLAN. An EVPN instance includes one or more broadcast domains. Ethernet tags are assigned to the broadcast domains of a given EVPN instance by the provider of that EVPN. Each PE in a particular EVPN instance performs a mapping between broadcast domain identifiers understood by each of its attached CE(s) and the corresponding Ethernet tag.

The PEs that are connected to a multihomed CE use the border gateway protocol (BGP) Ethernet segment route messages to discover that each of the PEs is connected to the same Ethernet segment. The PEs advertise the Ethernet segment route, which includes an ESI and ES-import extended community. Referring to FIG. 1, PE1 and PE2 advertise an ES route with an ES-import extended community (along with other extended communities like the route target). The PEs also construct a filter that is based on an ES-import extended community, which results in only these PEs importing the ES route and identifying that they are connected to the same Ethernet segment.

An extended community is similar in most ways to a regular community. EVPNs use extended communities because the 4-octet regular community value might not provide enough expansion and flexibility. An extended community is an 8-octet value divided into two main sections.

Broadcast, unknown-unicast (e.g., that is broadcast in the Ethernet segment) and multicast (BUM) traffic is traffic that is sent to multiple destinations. As noted earlier, when a CE is multihomed to two or more PEs, either one or all of the multihomed PEs are used to reach the customer site depending on the multihoming mode of operation. The PE that assumes the primary role for forwarding BUM traffic to the CE is called the designated forwarder (DF). Further, each router in the set of other PEs advertising the autodiscovery route per Ethernet segment for the same ESI, and serving as the backup path in case the DF encounters a failure, is called a backup designated forwarder (BDF). A BDF may also be referred to as a non-DF router. On every Ethernet segment, the PEs participate in a procedure called DF election to select the DF and the BDF PEs.

The different modes of operation for EVPN multihoming include (1) single, (2) active-standby, and (3) active-active (also referred to as all-active since a CE can have three or more multihomed links with the EVPN). When a PE is connected to a single-homed customer site, the single mode is in operation. (The single mode is the default mode of operation, and does not require Ethernet segment values to be configured.) When only a single PE, among a group of PEs attached to an Ethernet segment, is allowed to forward traffic to and from that Ethernet segment, the Ethernet segment is defined to be operating in the active-standby redundancy mode. Finally, when all PEs attached to an Ethernet segment are allowed to forward traffic to and from the Ethernet segment, the Ethernet segment is defined to be operating in the active-active (or all-active) redundancy mode.

Referring back to FIG. 1, the ESI 00:11:22:33:44:55:66: 77:88:99 Ethernet segment for CE1 is multihomed to PE1 and PE2. The Ethernet segment on the CE1 can either be configured as a link aggregation group (LAG) or as an ECMP path. CE2 is single-homed and has an ESI value of 0.

§ 1.2.3 IGMP Snooping

Multicast source and receiver hosts in the EVPN instance (EVI) can each be single-homed to one PE or multihomed in all-active mode to multiple PEs. Sources and receivers can also be attached to PEs in the EVI at the same site or at different sites. For receivers that are multihomed to multiple PEs, IGMP or MLD state information is synchronized among the peer PEs. IGMP and MLD snooping can be enabled for multiple EVIs, and either for specific bridge domains, or VLANs in an EVI, or all bridge domains or VLANs within an EVPN virtual switch instance. Multicast traffic can be forwarded within a bridge domain or VLAN, and can be routed across bridge domains or VLANs at Layer 3 using IRB interfaces.

In an environment with significant multicast traffic, using IGMP or MLD snooping advantageously constrains multicast traffic in a broadcast domain or VLAN to interested receivers and multicast devices, which conserves network bandwidth. Synchronizing IGMP or MLD state among all EVPN PEs for multihomed receivers ensures that all subscribed listeners receive multicast traffic, even if IGMP or MLD membership reports for a multicast group arrive on a PE that is not the Ethernet segment's DF, and even if an IGMP or MLD message to leave a multicast group arrives at a different PE than the PE where the corresponding join message for the group was received.

§ 1.2.3.1 Multicast Forwarding with IGMP or MLD Snooping in Single-Homed or Multihomed Ethernet Segments Hosts in the network send IGMP or MLD reports expressing interest in particular multicast groups from IPv4 multicast sources (using IGMP) or IPv6 multicast sources (using MLD). PEs with IGMP or MLD snooping enabled listen to IGMP or MLD packets and use that snooped information on the access side to establish multicast routes that only forward traffic for a multicast group to interested receivers.

As noted in § 1.2.2 above, for redundancy, an EVPN-MPLS environment can have multicast sources and receivers multihomed to a set of peer PEs that are in all-active mode. When all PEs in the EVI have snooping enabled, the IGMP or MLD state is synchronized among the multihomed peer PEs so multicast traffic can reach all listeners.

In an EVI with receivers that are multihomed to multiple PEs, corresponding IGMP or MLD join and leave messages for multicast group management might not be sent to the same PE, so all the PEs must synchronize and share IGMP and MLD state. PEs with snooping enabled in this environment exchange BGP EVPN Type 7 (Join Sync Route) and Type 8 (Leave Synch Route) network layer reachability information (NLRI) to synchronize IGMP or MLD membership reports received on multihomed interfaces. IGMP and MLD snooping in this environment is supported only with multihoming PEs in all-active mode.

The advertised EVPN Type 7 and Type 8 routes also carry EVI route target extended community attributes associated with multihomed EVIs, so multiple EVPN routing instances can be supported simultaneously. These routes are only imported by PEs that share the same Ethernet segment ID.

Processing leave messages and membership route withdrawals in a multihomed environment is more complicated when the leave message is not received by the same PE that processed the join message, but is facilitated using BGP EVPN Type 8 routes as follows. A PE that receives an IGMP or MLD leave message for a group advertises a Type 8 route. Other PEs import the Type 8 route. The PE that advertised the Type 8 route originates a membership query for any remaining group members, and starts a leave timer. The other PEs that imported the Type 8 route likewise start a leave timer. If no join membership reports are received by the time the timer expires, the PE that advertised the Type 7 route withdraws the Type 7 route. The PE that originated the Type 8 route withdraws the Type 8 route.

§ 1.2.3.2 IGMP or MLD Versions and Supported Group Membership Report Modes

By default, the EVPN-MPLS network can process (*,G) (any-source multicast (ASM)) membership reports with IGMPv2, MLDv1, and MLDv2. If the network has hosts sending both MLDv1 and MLDv2 ASM reports for a given group, PEs will process MLDv1 and MLDv2 reports for the group as MLDv1 membership reports. PEs can be configured, alternatively, to process only (S,G) (source-specific multicast (SSM)) membership reports as an MLD snooping configuration option with MLDv2. SSM-only processing can be enabled for one or more bridge domains in the EVI. When enabling this option with MLD snooping for a virtual switch, the behavior applies to all bridge domains in the virtual switch instance. When this option is enabled, ASM reports are not processed and are dropped.

§ 1.2.3.3 Multicast Traffic Forwarding with Single-Homed or Multihomed Receivers In an EVPN-MPLS network where hosts might be multihomed to more than one PE, when a bridge domain (or VLAN) is configured on a PE, the PE signals a BGP EVPN Type 3 (Inclusive Multicast Ethernet Tag (IMET)) route to the other PEs in the instance to build a core multicast replication tree for each configured bridge domain.

With IGMP or MLD snooping enabled, a PE receiving multicast traffic to be forwarded is referred to as the "ingress" PE. To ensure multicast traffic reaches all remote PEs in the EVI, the ingress PE uses the IMET routing information with ingress replication in the EVPN core, replicating and flooding the packets on the EVPN tunnels to all of the other PEs (or external edge routers) in the EVI that might need to forward the traffic. If a multihoming PE receives multicast traffic from the EVPN core and it is the DF for an interested receiver for the multicast group, the PE forwards the traffic; otherwise, if it is not the DF for any interested receivers, the PE does not forward the traffic. On the access side, upon receiving multicast data from the EVPN core, PEs selectively forward the multicast traffic only to interested receivers. Single-homing PEs use learned IGMP or MLD snooping information, while multihoming PEs use both IGMP or MLD snooping information and EVPN Type 7 routes.

§ 1.2.3.4 IGMP or MLD Snooping with Multicast Forwarding Between Bridge Domains or VLANS Using IRB Interfaces For multicast forwarding between bridge domains or VLANs in this environment, PEs can use Protocol Independent Multicast (PIM) in distributed designated router (DDR) mode on IRB interfaces. The IRB interfaces on PEs route multicast traffic between bridge domains or VLANs as follows. Upon receiving multicast traffic on an IRB interface from a multicast source, the PE routes the traffic to any IRBs that have PIM enabled and are configured for bridge domains or VLANs with interested local receivers for the multicast group. With PIM DDR configured, PEs with IRB interfaces route multicast traffic to local receivers whether or not the IRB is the elected PIM designated router (DR). To prevent multicast traffic duplication, IRB-routed multicast traffic is not forwarded back to the EVPN core.

§ 1.2.3.5 Internet Group Management Protocol (IGMP) and Multicast Listener Discovery (MLD) Proxy for EVPN The document, A. Sajassi, et al., "IGMP and MLD Proxy for EVON," draft-ietf-bess-evpn-igmp-mld-proxy-03 (Internet Engineering Task Force, Jun. 10, 2019) (referred to as "the Sajassi draft" and incorporated herein by reference) discusses how to support, efficiently, endpoints running IGMP for certain services over an EVPN network. The Sajassi draft seeks to reduce flooding of IGMP messages, allow the EVPN network to act as a distributed anycast multicast proxy, and selectively multicast to only those PEs of the EVPN that have an interest in the multicast group. Section 4 of the Sajassi draft discusses how to handle IGMP in the context of an all-active multihomed CE. Section 7 of the Sajassi draft discusses the use of BGP encoding of EVPN routes.

§ 1.2.4 Problem of Unsynchronized Mrouter Capability Towards EVPN Multihomed PIM Device(s)

Problems caused by unsynchronized multicast router (mrouter) capability on devices (PE1 and PE2) on the same Ethernet segment (ES), multihomed to the same device (CE1) (e.g., via an aggregated Ethernet bundle, such as link aggregation group (LAG)), and running IGMP and/or MLD snooping and PIM on one or more VLANs within an EVPN, such as those in the example environment of FIG. 1, are now described with reference to FIGS. 2A-2D. Referring first to FIG. 2A, when CE1 wants to send out an IGMP query, it is not known ahead of time which of the two links of the LAG it will use. That is, the link of the LAG to be used can be thought of as non-deterministic. Suppose the IGMP query 210 is provided to PE1 (but not to PE2) via a link of the LAG. Referring to FIG. 2B, PE1 detects, via IGMP snooping, the IGMP query 210, and in response, PE1 marks the interface towards CE1 as an multicast router (mrouter) port 220. Further, an instance of the IGMP query 210' will reach PE2 over the EVPN emulated LAN on an L2-routed virtual tunnel endpoint (RVTEP) interface and an L3-integrated routing and bridging (IRB) MVLAN. Since PE2 did not detect, via IGMP snooping, the IGMP query on its interface with CE1, it will not mark this interface as an mrouter port. Rather, as shown in FIG. 2C, it will mark an interface 230 on the VLAN side.

Referring now to FIG. 2D, suppose that CE wants to pull multicast traffic from within the VLAN fabric. For example, a host (multicast receiver) 280 coupled with CE1 may want to receive multicast packets from a host (multicast source) 290 coupled with CE2. Consequently, assume that CE1 sends a PIM (S,G) Join 240. Since the Ethernet link is not known ahead of time, assume that the PIM (S,G) Join 240 is sent on the link to PE2. PE2 will add in its L3-multicast forwarding outgoing interface (OIF), the IRB-MVLAN interface. Since, however, the MVLAN was snooping enabled, PE2 will not forward the traffic on the interface towards CE1. (This is because, PE2 did not mark that particular interface as an mrouter port since it did not detect, via IGMP snooping, the earlier IGMP query 210 directly on that particular interface.) Note that even though the PIM (S,G) Join 240 may have been sent from CE to PE2 on the desired interface, PE2 will not forward traffic on that interface since it is IGMP snooping enabled and has not detected an IGMP report (or query) on that particular interface for the group, nor has it detected an IGMP query on that particular interface.

In view of the foregoing, it would be useful to synchronize the multihomed interfaces in the ES so that when one of the multihoming interfaces becomes an mrouter port, any other multihoming interfaces in the ES also become mrouter ports.

§ 2. SUMMARY OF THE INVENTION

Example embodiments (e.g., methods, apparatus and systems) consistent with the present description provide port synchronization for multicast on an Ethernet segment (ES) in which a device (CE) is multihomed to at least two devices (PE1 and PE2) of a VLAN. Such example embodiments may do so by providing computer-implemented method for use in a first device belonging to an Ethernet virtual private network (EVPN) and an Ethernet segment (ES), the ES including a second device and a third device, the second device also belonging to the EVPN, the third device being multihomed to the first device and the second device via the ES, and the first and second devices having snooping enabled for multicast group messages, the computer-implemented method comprising: (a) detecting, on a first interface of the first device, from the third device via the ES, a multicast query message, wherein the multicast query message is not detected by the second device via the ES; (b) marking the first interface of the first device as a multicast router port; (c) generating a message identifying the ES and including information encoding that the multicast query message was detected on the ES; and (d) sending, via the EVPN, the message generated to the second device so that the second device will mark an interface, on the ES, with the third device, as a multicast router port.

In at least some example embodiments consistent with the present description, the message generated is a sent via a border gateway protocol (BGP) message. For example, the BGP message may include a Type-7 route for any multicast group and any multicast source. In at least some example embodiments consistent with the present description, he BGP message includes a Type-7 (*,*) route.

In at least some example embodiments consistent with the present description, the message generated is sent to multiple devices belonging to the EVPN, but only those of the multiple devices that also belong to the ES process the generated message.

In at least some example embodiments consistent with the present description, the first device and the second device are provider edge devices (PEs) in a service provider transport network. In at least some other example embodiments consistent with the present description, the first and second devices are access routers in a data center.

In at least some example embodiments consistent with the present description, the third device is a customer edge device (CE). For example, the third device may be one of (A) a host device, (B) a router, or (C) a switch.

In at least some example embodiments consistent with the present description, the multicast query message is an Internet Group Management Protocol (IGMP) message, or a Multicast Listener Discover (MLD) message.

In at least some example embodiments consistent with the present description, wherein the third device is multihomed to the first device and the second device via the ES in an all-active mode. In such example embodiments, the first device may be a designated forwarder (DF). In such example embodiments, the third device may be multihomed to the first device and the second device via a link aggregation group (LAG). In such example embodiments, data may be sent from the third device, non-deterministically, to a selected one of the first device and the second device.

Later, assume that the multicast router port of the second device receives or detects a multicast group join message, specifying a multicast group G from the third device via the ES. Upon receiving, on an interface of the second device facing the EVPN, multicast traffic for the multicast group G originated by a source device (S) for the multicast group G, the second device may forward the received multicast traffic for the multicast group G to the third device via the ES.

In at least some example embodiments consistent with the present description, the EVPN uses multiprotocol label switching (MPLS) encapsulation. In at least some other example embodiments consistent with the present description, the EVPN uses Virtual Extensible Local Area Network (VxLAN) encapsulation.

§ 3. BRIEF DESCRIPTION OF THE DRAWINGS

FIGS. 7A and 7B illustrate example packet forwarding operations of the example distributed ASICs of FIG. 6.

§ 4. DETAILED DESCRIPTION

The present description may involve novel methods, apparatus, message formats, and/or data structures for providing port synchronization for multicast on an Ethernet segment (ES) in which a first device is multihomed to at least two devices of a VLAN, on which IGMP and/or MLD snooping is enabled. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§ 4.1 Example Methods

Figure 3:
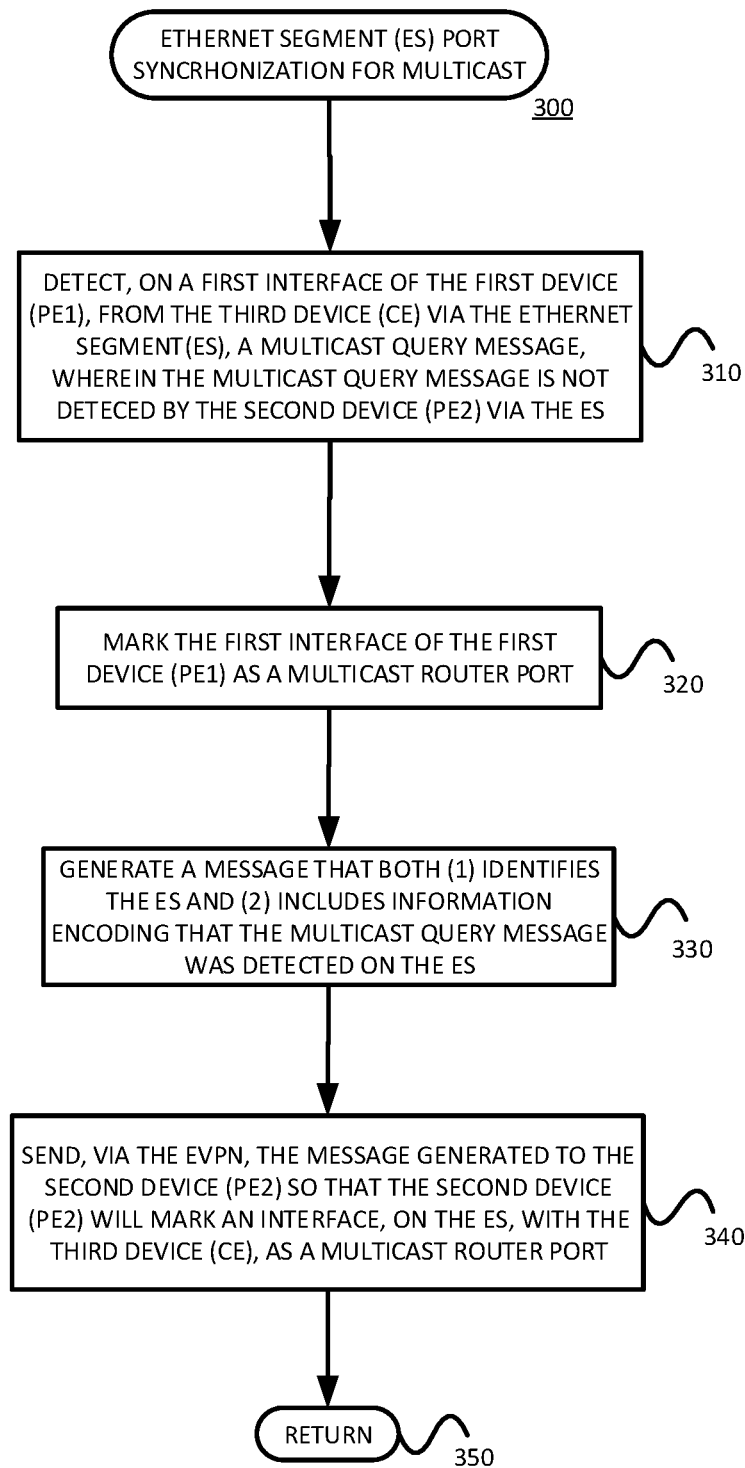
FIG. 3 is a flow diagram of an example method for providing port synchronization for multicast on an Ethernet segment (ES) in which a first device is multihomed to at least two devices of a VLAN, in a manner consistent with the present description.

FIG. 3 is a flow diagram of an example method 300 for providing port synchronization for multicast on an Ethernet segment (ES). The example method 300 may be used in a first device (PE1) (and indeed all PEs) belonging to an Ethernet virtual private network (EVPN) and an Ethernet segment (ES), the ES including a second device (PE2) and a third device (CE). The second device (PE2) also belongs to the EVPN. The third device (CE) is multihomed to the first device (PE1) and the second device (PE2) via the ES. The first and second devices (PE1 and PE2) have snooping enabled for multicast group messages. In the example method 300, the first device (PE1) detects, on a first interface via IGMP snooping, from the third device (CE) via the ES, a multicast query message. Note that the multicast query message is not necessarily (or deterministically) detected by the second device (PE2) via the ES. Assume that the multicast group query message is not detected (e.g., snooped) by the second device (PE2) via the ES. The first device (PE1) then marks the first interface as a multicast router (mrouter) port. The first device (PE1) also generates a message identifying the ES (e.g., using the ESI) and including information encoding that the multicast query message was detected on the ES. Finally, the first device (PE1) sends, via the EVPN, the message generated to the second device (PE2) so that the second device (PE2) will mark an interface, which is on the ES, and which is with the third device (CE), as a multicast router (mrouter) port. In this way, first and second devices (PE1 and PE2) have interfaces on the ES, with the third device (CE) synchronized, such that they are both marked as a multicast router (mrouter) port.

Referring back to block 310 of FIG. 3, in some example implementations of the example method 300, the multicast group message is an Internet Group Management Protocol (IGMP) message. In some example implementations of the example method 300, the multicast group message is a Multicast Listener Discover (MLD) message.

Referring back to block 330 of FIG. 3, in some example implementations of the example method 300, message generated is sent via a border gateway protocol (BGP) message (e.g., as an NLRI route). In some example implementations of the example method 300, the BGP message includes a Type-7 route, such as a Type-7 (*,*) route for example, for any multicast group and any multicast source. The message may use techniques and/or formats described in the Sajassi draft.

Referring back to block 340 of FIG. 3, in some example implementations of the example method 300, the message generated is sent to multiple devices belonging to the EVPN, but only those of the multiple devices that also belong to the identified ES process the generated message. Recall that the message identifies the ES, so devices (e.g., PEs) not belonging to the particular ES may ignore or otherwise discard the message.

In some example implementations of the example method 300, the first device and the second device are provider edge devices (PEs) in a service provider transport network. In some other example implementations of the example method 300, the first and second devices are access routers in a data center. In some example implementations of the example method 300, the third device is a customer edge device (CE), such as (A) a host device, (B) a router, (C) a switch, etc.

In some example implementations of the example method 300, the third device (CE) is multihomed to the first device (PE1) and the second device (PE2) via the ES in an active-active or all-active mode. Although the first device (PE1) may have been selected as the designated forwarder (DF), this is not required.

In some example implementations of the example method 300, the third device (CE) is multihomed to the first device (PE1) and the second device (PE2) via a link aggregation group (LAG). In some example implementations of the example method 300, data is sent from the third device (CE), non-deterministically (e.g., in accordance with a hash function), to a selected one of the first device (PE1) and the second device (PE2).

As a result of running the example method 300, the first and second devices (PE1 and PE2) have interfaces on the ES, with the third device (CE), synchronized, such that they are both marked as a multicast router (mrouter) port. Now assume that the multicast router port of the second device (PE), receives a multicast group join message, specifying a multicast group G from the third device (CE) via the ES. It will then set up an interface and forwarding information for the multicast group G. Therefore, when the second device (PE2) receives, on an interface facing the EVPN, multicast traffic for the multicast group G originated by a source device (S) for the multicast group G, it will forward the received multicast traffic for the multicast group G to the third device (CE) via the ES.

§ 4.2 Example Apparatus

Figure 4:
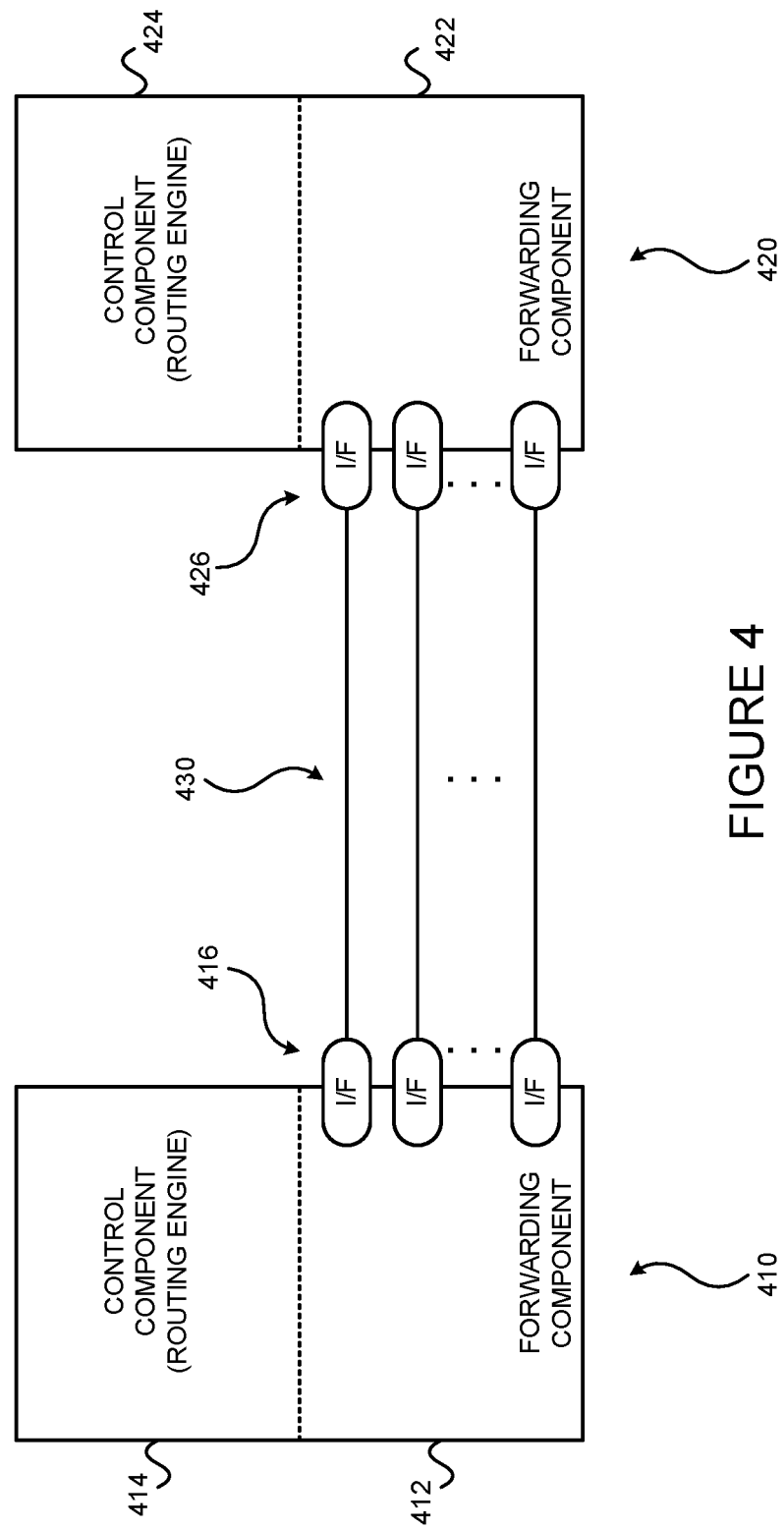
FIG. 4 illustrates an example environment including two systems coupled via communications links.

FIG. 4 illustrates two data forwarding systems 410 and 420 coupled via communications links 430. The links may be physical links or "wireless" links. The data forwarding systems 410, 420 may be nodes, such as routers for example. If the data forwarding systems 410, 420 are example routers, each may include a control component (e.g., a routing engine) 414, 424 and a forwarding component 412, 422. Each data forwarding system 410, 420 includes one or more interfaces 416, 426 that terminate one or more communications links 430. The PIM router may be implemented on device 410 and/or 420. The example method 300 described above may be implemented in the control component 414 and/or 424 of device 410 and/or 420.

As just discussed above, and referring to FIG. 5, some example routers 500 include a control component (e.g., routing engine) 510 and a packet forwarding component (e.g., a packet forwarding engine) 590.

The control component 510 may include an operating system (OS) kernel 520, routing protocol process(es) 530, label-based forwarding protocol process(es) 540, interface process(es) 550, user interface (e.g., command line interface) process(es) 560, and chassis process(es) 570, and may store routing table(s) 539, label forwarding information 545, and forwarding (e.g., route-based and/or label-based) table(s) 580. As shown, the routing protocol process(es) 530 may support routing protocols such as the routing information protocol ("RIP") 531, the intermediate system-to-intermediate system protocol ("IS-IS") 532, the open shortest path first protocol ("OSPF") 533, the enhanced interior gateway routing protocol ("EIGRP") 534 and the border gateway protocol ("BGP") 535, and the label-based forwarding protocol process(es) 540 may support protocols such as BGP 535, the label distribution protocol ("LDP") 536 and the resource reservation protocol ("RSVP") 537. The label-based forwarding protocol process(es) 540 may implement the example method 300 of FIG. 3. One or more components (not shown) may permit a user 565 to interact with the user interface process(es) 560. Similarly, one or more components (not shown) may permit an outside device to interact with one or more of the router protocol process(es) 530, the label-based forwarding protocol process(es) 540, the interface process(es) 550, and the chassis process(es) 570, via SNMP 585, and such processes may send information to an outside device via SNMP 585.

The packet forwarding component 590 may include a microkernel 592, interface process(es) 593, distributed ASICs 594, chassis process(es) 595 and forwarding (e.g., route-based and/or label-based) table(s) 596.

Figure 5:
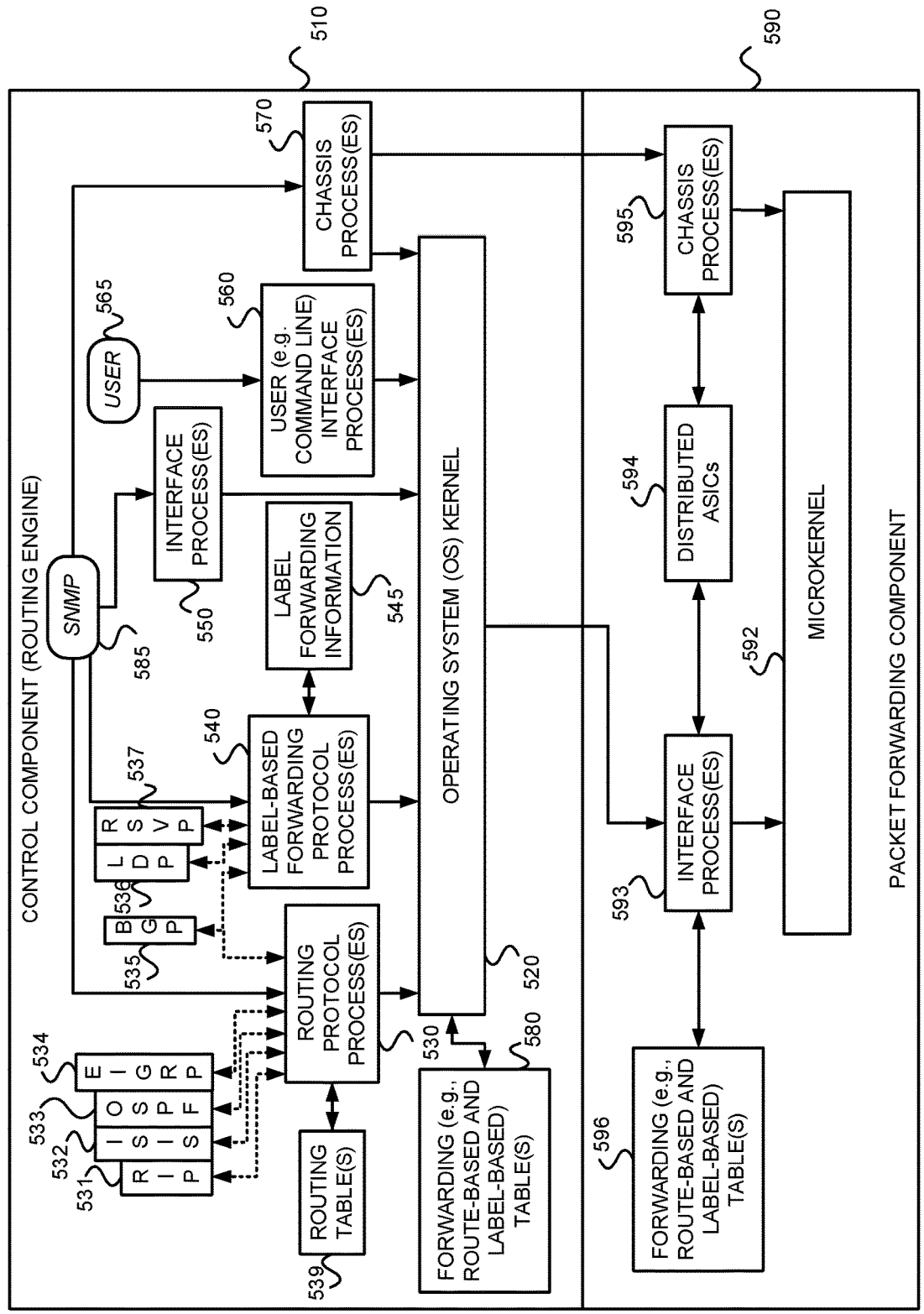
FIG. 5 is a block diagram of an example router on which the example methods of the present description may be implemented.

In the example router 500 of FIG. 5, the control component 510 handles tasks such as performing routing protocols, performing label-based forwarding protocols, control packet processing, etc., which frees the packet forwarding component 590 to forward received packets quickly. That is, received control packets (e.g., routing protocol packets and/or label-based forwarding protocol packets) are not fully processed on the packet forwarding component 590 itself, but are passed to the control component 510, thereby reducing the amount of work that the packet forwarding component 590 has to do and freeing it to process packets to be forwarded efficiently. Thus, the control component 510 is primarily responsible for running routing protocols and/or label-based forwarding protocols, maintaining the routing tables and/or label forwarding information, sending forwarding table updates to the packet forwarding component 590, and performing system management. The example control component 510 may handle routing protocol packets, provide a management interface, provide configuration management, perform accounting, and provide alarms. The processes 530, 540, 550, 560 and 570 may be modular, and may interact with the OS kernel 520. That is, nearly all of the processes communicate directly with the OS kernel 520. Using modular software that cleanly separates processes from each other isolates problems of a given process so that such problems do not impact other processes that may be running. Additionally, using modular software facilitates easier scaling.

Still referring to FIG. 5, the example OS kernel 520 may incorporate an application programming interface ("API") system for external program calls and scripting capabilities. The control component 510 may be based on an Intel PCI platform running the OS from flash memory, with an alternate copy stored on the router's hard disk. The OS kernel 520 is layered on the Intel PCI platform and establishes communication between the Intel PCI platform and processes of the control component 510. The OS kernel 520 also ensures that the forwarding tables 596 in use by the packet forwarding component 590 are in sync with those 580 in the control component 510. Thus, in addition to providing the underlying infrastructure to control component 510 software processes, the OS kernel 520 also provides a link between the control component 510 and the packet forwarding component 590.

Referring to the routing protocol process(es) 530 of FIG. 5, this process(es) 530 provides routing and routing control functions within the platform. In this example, the RIP 531, ISIS 532, OSPF 533 and EIGRP 534 (and BGP 535) protocols are provided. Naturally, other routing protocols (such as that described in the Sajassi draft) may be provided in addition, or alternatively. Similarly, the label-based forwarding protocol process(es) 540 provides label forwarding and label control functions. In this example, the LDP 536 and RSVP 537 (and BGP 535) protocols are provided. Naturally, other label-based forwarding protocols (e.g., MPLS) may be provided in addition, or alternatively. In the example router 500, the routing table(s) 539 is produced by the routing protocol process(es) 530, while the label forwarding information 545 is produced by the label-based forwarding protocol process(es) 540.

Still referring to FIG. 5, the interface process(es) 550 performs configuration of the physical interfaces (Recall, e.g., 516 and 526 of FIG. 5.) and encapsulation.

The example control component 510 may provide several ways to manage the router (e.g., for configuring the interval as discussed with reference to block 305 of FIG. 3). For example, it 510 may provide a user interface process(es) 560 which allows a system operator 565 to interact with the system through configuration, modifications, and monitoring. The SNMP 585 allows SNMP-capable systems to communicate with the router platform. This also allows the platform to provide necessary SNMP information to external agents. For example, the SNMP 585 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 510, thereby avoiding slowing traffic forwarding by the packet forwarding component 590.

Although not shown, the example router 500 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 560 via a console port, an auxiliary port, and/or a management Ethernet port. As noted, the interval may be configured using the CLI.

The packet forwarding component 590 is responsible for properly outputting received packets as quickly as possible. If there is no entry in the forwarding table for a given destination or a given label and the packet forwarding component 590 cannot perform forwarding by itself, it 590 may send the packets bound for that unknown destination off to the control component 510 for processing. The example packet forwarding component 590 is designed to perform Layer 2 and Layer 3 switching, route lookups, and rapid packet forwarding.

As shown in FIG. 5, the example packet forwarding component 590 has an embedded microkernel 592, interface process(es) 593, distributed ASICs 594, and chassis process(es) 595, and stores a forwarding (e.g., route-based and/or label-based) table(s) 596. The microkernel 592 interacts with the interface process(es) 593 and the chassis process(es) 595 to monitor and control these functions. The interface process(es) 592 has direct communication with the OS kernel 520 of the control component 510. This communication includes forwarding exception packets and control packets to the control component 510, receiving packets to be forwarded, receiving forwarding table updates, providing information about the health of the packet forwarding component 590 to the control component 510, and permitting configuration of the interfaces from the user interface (e.g., CLI) process(es) 560 of the control component 510. The stored forwarding table(s) 596 is static until a new one is received from the control component 510. The interface process(es) 593 uses the forwarding table(s) 596 to look up next-hop information. The interface process(es) 593 also has direct communication with the distributed ASICs 594. Finally, the chassis process(es) 595 may communicate directly with the microkernel 592 and with the distributed ASICs 594.

In the example router 500, the example method 300 consistent with the present disclosure may be implemented in the control component 510, and more specifically, in the label-based forwarding protocol process(es) 540.

Figure 6:
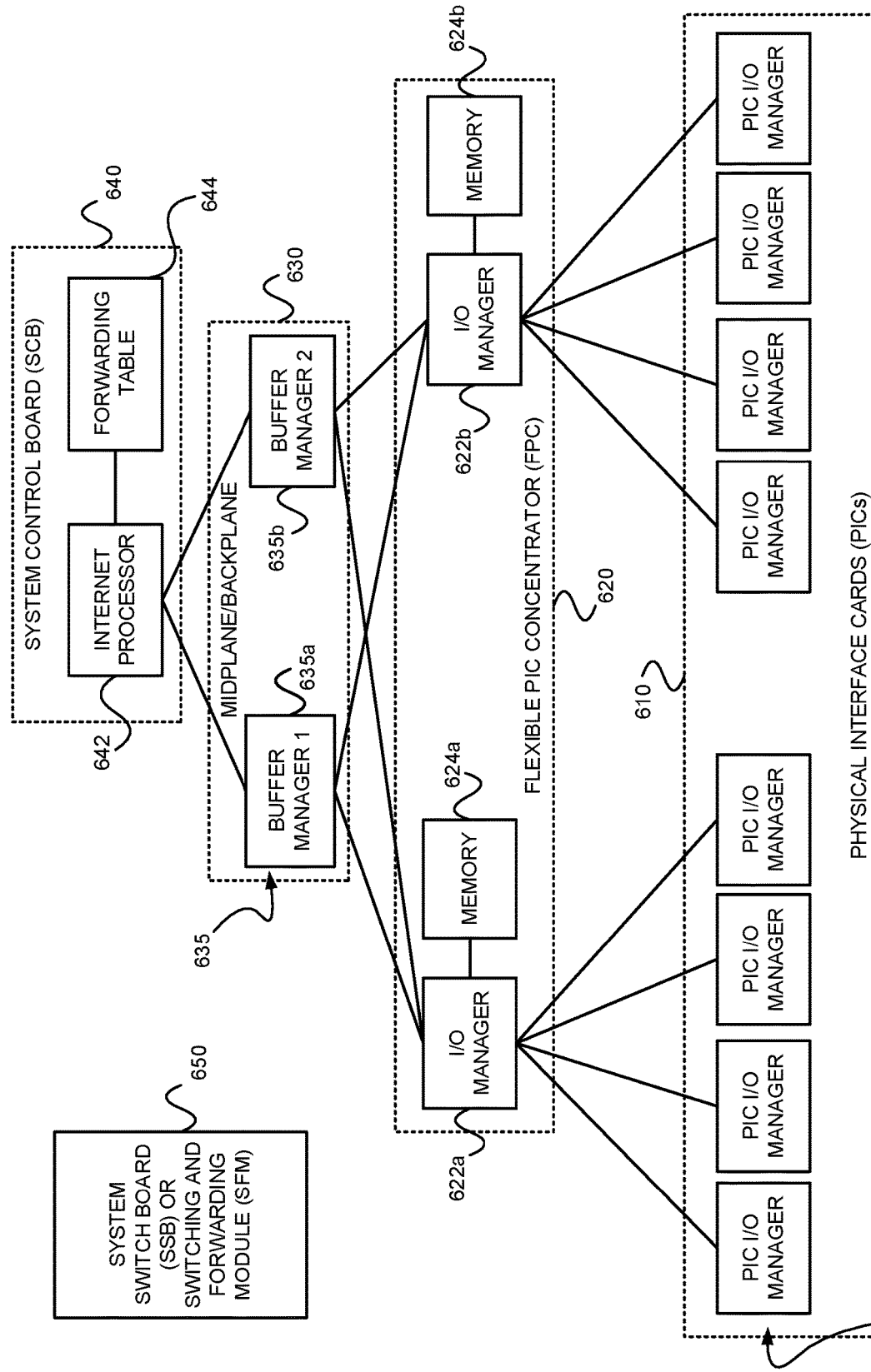
FIG. 6 is a block diagram of example distributed application specific integrated circuits ("ASICs") that may be provided in the example router of FIG. 5.

Referring back to distributed ASICs 594 of FIG. 5, FIG. 6 is an example of how the ASICS may be distributed in the packet forwarding component 590 to divide the responsibility of packet forwarding. As shown in FIG. 6, the ASICs of the packet forwarding component 590 may be distributed on physical interface cards ("PICs") 610, flexible PIC concentrators ("FPCs") 620, a midplane or backplane 630, and a system control board(s) 640 (for switching and/or forwarding). Switching fabric is also shown as a system switch board ("SSB"), or a switching and forwarding module ("SFM") 650. Each of the PICs 610 includes one or more PIC I/O managers 615. Each of the FPCs 620 includes one or more I/O managers 622, each with an associated memory 624. The midplane/backplane 630 includes buffer managers 635a, 635b. Finally, the system control board 640 includes an Internet processor 642 and an instance of the forwarding table 644 (Recall, e.g., 596 of FIG. 5).

Still referring to FIG. 6, the PICs 610 contain the interface ports. Each PIC 610 may be plugged into an FPC 620. Each individual PIC 610 may contain an ASIC that handles media-specific functions, such as framing or encapsulation. Some example PICs 610 provide SDH/SONET, ATM, Gigabit Ethernet, Fast Ethernet, and/or DS3/E3 interface ports.

An FPC 620 can contain from one or more PICs 610, and may carry the signals from the PICs 610 to the midplane/backplane 630 as shown in FIG. 6.

The midplane/backplane 630 holds the line cards. The line cards may connect into the midplane/backplane 630 when inserted into the example router's chassis from the front. The control component (e.g., routing engine) 510 may plug into the rear of the midplane/backplane 630 from the rear of the chassis. The midplane/backplane 630 may carry electrical (or optical) signals and power to each line card and to the control component 510.

The system control board 640 may perform forwarding lookup. It 640 may also communicate errors to the routing engine. Further, it 640 may also monitor the condition of the router based on information it receives from sensors. If an abnormal condition is detected, the system control board 640 may immediately notify the control component 510.

Referring to FIGS. 6, 7A and 7B, in some exemplary routers, each of the PICs 610, 510' contains at least one I/O manager ASIC 615 responsible for media-specific tasks, such as encapsulation. The packets pass through these I/O ASICs on their way into and out of the router. The I/O manager ASIC 615 on the PIC 610, 510' is responsible for managing the connection to the I/O manager ASIC 622 on the FPC 620, 520', managing link-layer framing and creating the bit stream, performing cyclical redundancy checks (CRCs), and detecting link-layer errors and generating alarms, when appropriate. The FPC 620 includes another I/O manager ASIC 622. This ASIC 622 takes the packets from the PICs 610 and breaks them into (e.g., 64-byte) memory blocks. This FPC I/O manager ASIC 622 sends the blocks to a first distributed buffer manager (DBM) 635a', decoding encapsulation and protocol-specific information, counting packets and bytes for each logical circuit, verifying packet integrity, and applying class of service (CoS) rules to packets. At this point, the packet is first written to memory. More specifically, the example DBM ASIC 635a' manages and writes packets to the shared memory 624 across all FPCs 620. In parallel, the first DBM ASIC 635a' also extracts information on the destination of the packet and passes this forwarding-related information to the Internet processor 642/542'. The Internet processor 642/542' performs the route lookup using the forwarding table 644 and sends the information over to a second DBM ASIC 635b'. The Internet processor ASIC 642/542' also collects exception packets (i.e., those without a forwarding table entry) and sends them to the control component 510. The second DBM ASIC 635b' then takes this information and the 64-byte blocks and forwards them to the I/O manager ASIC 622 of the egress FPC 620/520' (or multiple egress FPCs, in the case of multicast) for reassembly. (Thus, the DBM ASICs 635a' and 635b' are responsible for managing the packet memory 624 distributed across all FPCs 620/520', extracting forwarding-related information from packets, and instructing the FPC where to forward packets.)

The I/O manager ASIC 622 on the egress FPC 620/520' may perform some value-added services. In addition to incrementing time to live ("TTL") values and re-encapsulating the packet for handling by the PIC 610, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 622 on the egress FPC 620/520' may be responsible for receiving the blocks from the second DBM ASIC 635b', incrementing TTL values, queuing a pointer to the packet, if necessary, before applying CoS rules, re-encapsulating the blocks, and sending the encapsulated packets to the PIC I/O manager ASIC 615.

Figure 8:
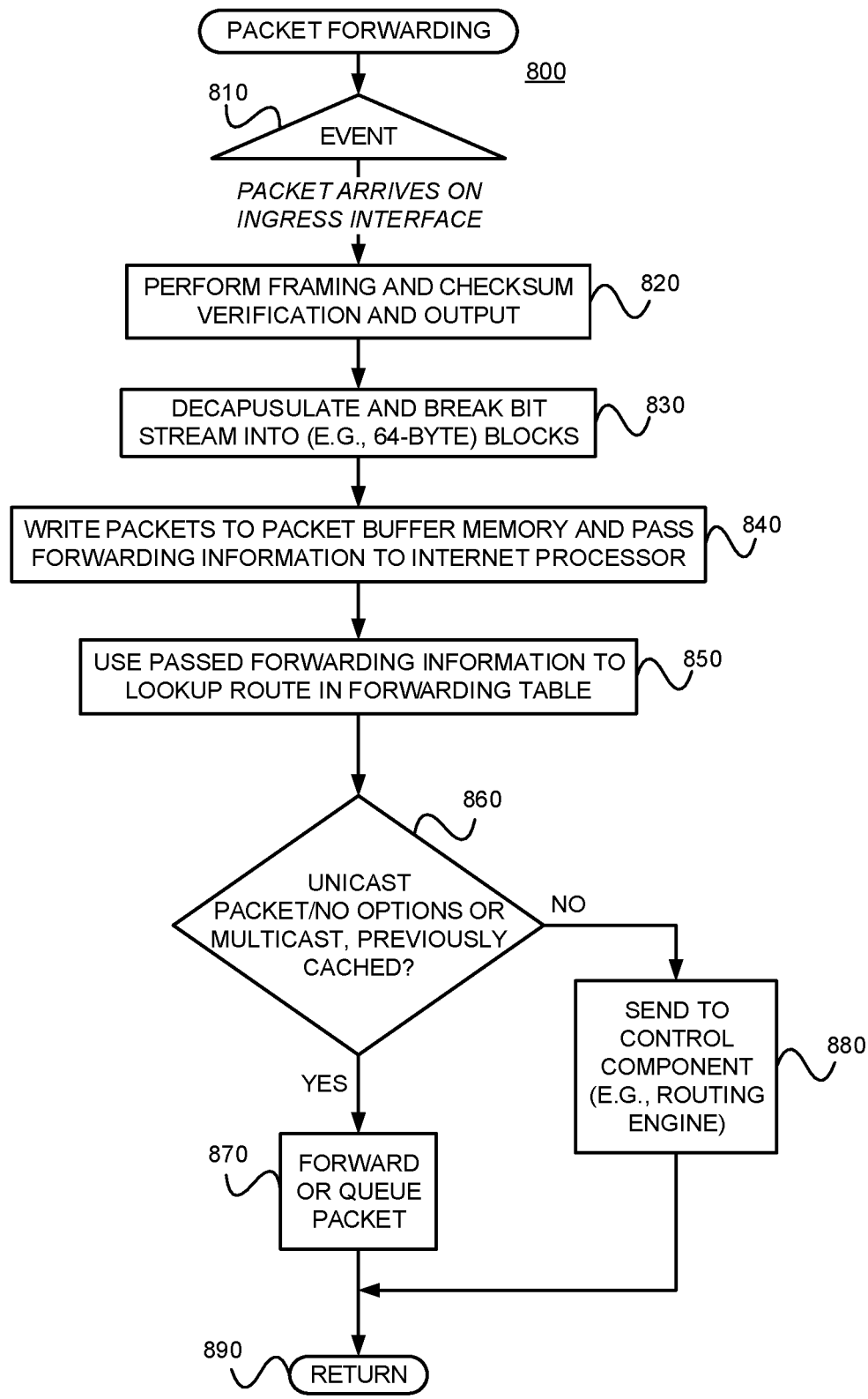
FIG. 8 is a flow diagram of an example packet forwarding method that may be implemented on any of the example routers of FIGS. 5 and 6.

FIG. 8 is a flow diagram of an example method 800 for providing packet forwarding in the example router. The main acts of the method 800 are triggered when a packet is received on an ingress (incoming) port or interface. (Event 810) The types of checksum and frame checks that are required by the type of medium it serves are performed and the packet is output, as a serial bit stream. (Block 820) The packet is then decapsulated and parsed into (e.g., 64-byte) blocks. (Block 830) The packets are written to buffer memory and the forwarding information is passed on the Internet processor. (Block 840) The passed forwarding information is then used to lookup a route in the forwarding table. (Block 850) (Recall, e.g., FIGS. 6A-6D.) Note that the forwarding table can typically handle unicast packets that do not have options (e.g., accounting) set, and multicast packets for which it already has a cached entry. Thus, if it is determined that these conditions are met (YES branch of Decision 860), the packet forwarding component finds the next hop and egress interface, and the packet is forwarded (or queued for forwarding) to the next hop via the egress interface (Block 870) before the method 800 is left (Node 890) Otherwise, if these conditions are not met (NO branch of Decision 860), the forwarding information is sent to the control component 510 for advanced forwarding resolution (Block 880) before the method 800 is left (Node 890).

Referring back to block 870, the packet may be queued. Actually, as stated earlier with reference to FIG. 6, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 622 may send a request for the packet to the second DBM ASIC 635b. The DBM ASIC 635 reads the blocks from shared memory and sends them to the I/O manager ASIC 622 on the FPC 620, which then serializes the bits and sends them to the media-specific ASIC of the egress interface. The I/O manager ASIC 615 on the egress PIC 610 may apply the physical-layer framing, perform the CRC, and send the bit stream out over the link.

Referring back to block 880 of FIG. 8, as well as FIG. 6, regarding the transfer of control and exception packets, the system control board 640 handles nearly all exception packets. For example, the system control board 640 may pass exception packets to the control component 510.

Although example embodiments consistent with the present disclosure may be implemented on the example routers of FIG. 4 or 5, embodiments consistent with the present disclosure may be implemented on communications network nodes (e.g., routers, switches, software defined network (SDN) controllers, etc.) having different architectures. For example, methods consistent with the present description may be run on any modern server, or even a virtual machine (e.g., without any ASICs or packet forwarding engines). More generally, embodiments consistent with the present disclosure may be implemented on an example system 900 as illustrated on FIG. 9.

Figure 9:
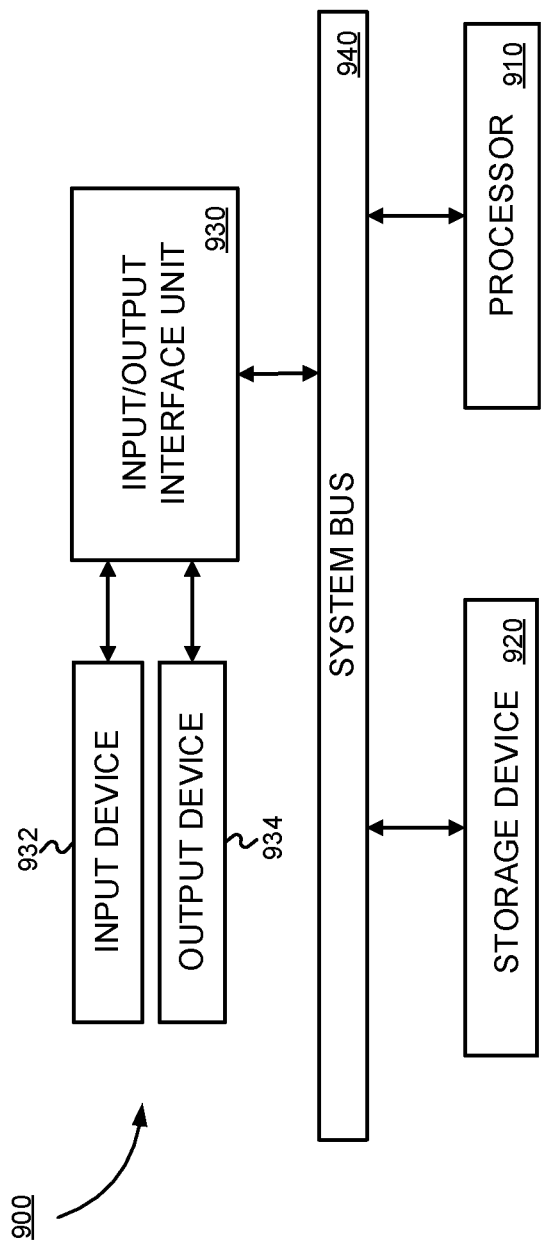
FIG. 9 is a block diagram of an example processor-based system that may be used to execute the example methods and/or to store information used and/or generated by such example methods.

FIG. 9 is a block diagram of an exemplary machine 900 that may perform one or more of the example methods described, and/or store information used and/or generated by such methods. The exemplary machine 900 includes one or more processors 910, one or more input/output interface units 930, one or more storage devices 920, and one or more system buses and/or networks 940 for facilitating the communication of information among the coupled elements. One or more input devices 932 and one or more output devices 934 may be coupled with the one or more input/output interfaces 930. The one or more processors 910 may execute machine-executable instructions (e.g., C or C++ running on the Linux operating system widely available from a number of vendors) to effect one or more aspects of the present disclosure. At least a portion of the machine executable instructions may be stored (temporarily or more permanently) on the one or more storage devices 920 and/or may be received from an external source via one or more input interface units 930. The machine executable instructions may be stored as various software modules, each module performing one or more operations. Functional software modules are examples of components, which may be used in the apparatus described.

In some embodiments consistent with the present disclosure, the processors 910 may be one or more microprocessors and/or ASICs. The bus 940 may include a system bus. The storage devices 920 may include system memory, such as read only memory (ROM) and/or random access memory (RAM). The storage devices 920 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present disclosure may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present disclosure may be downloaded as a computer program, which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present disclosure (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present disclosure (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, an SDN controller, or any device that has computing and networking capabilities.

§ 4.3 Example of Operations of an Example Method

Figure 1:
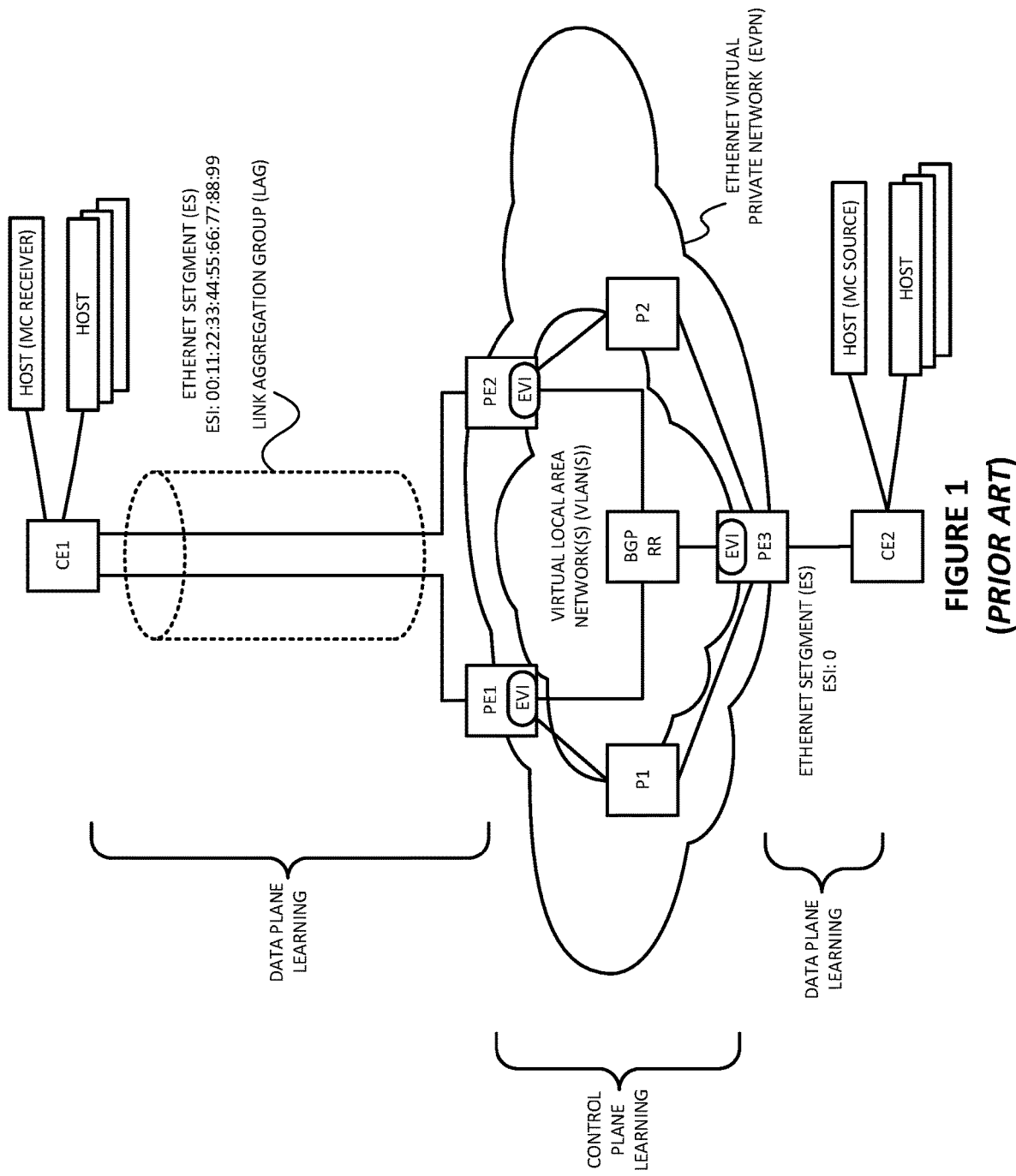
FIG. 1 is an example network topology used to describe problems solved by example methods consistent with the present description.
Figure 2A:
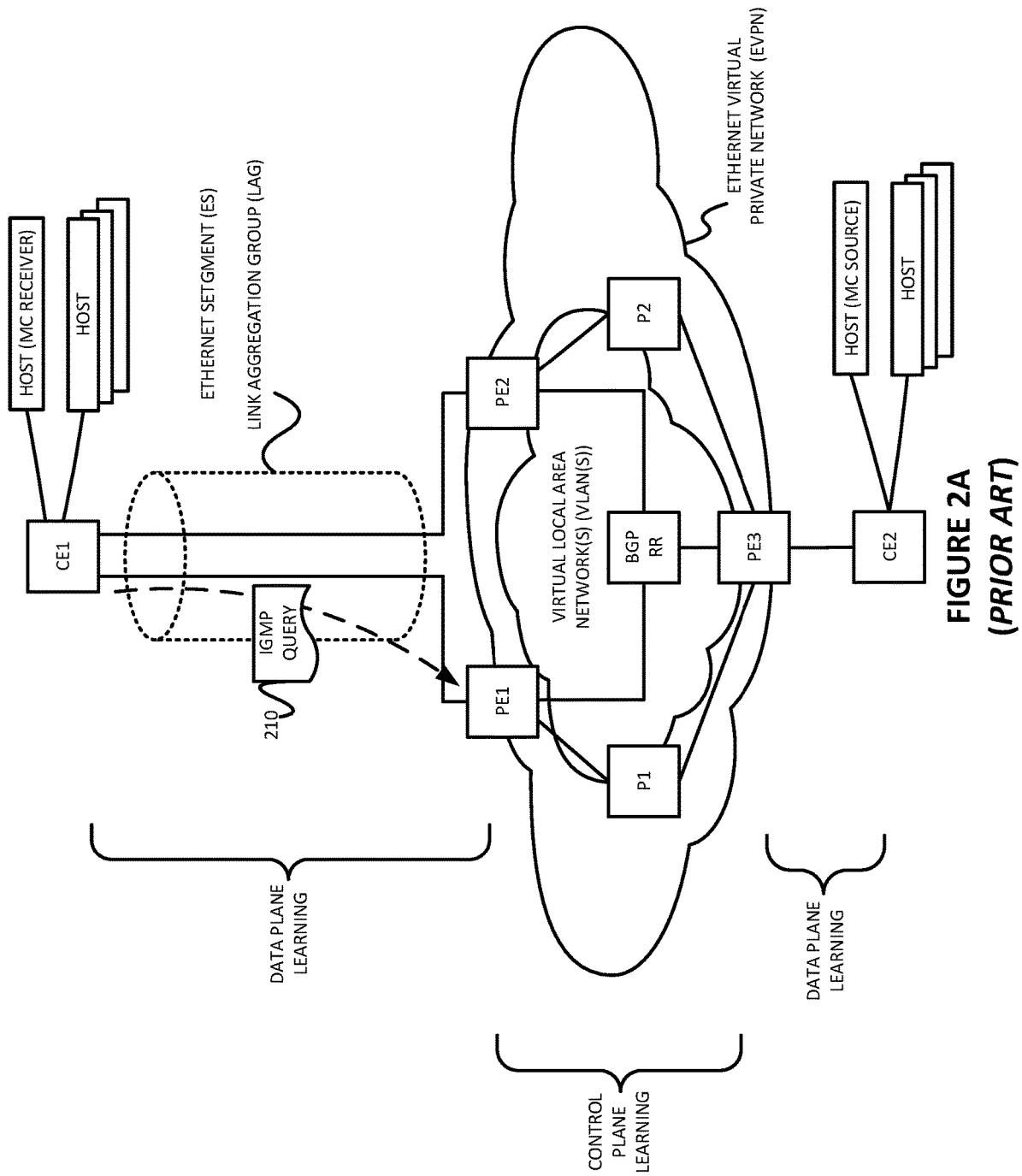
FIGS. 2A-2D illustrates a problem that may occur in a network topology such as that of FIG. 1.
Figure 2B:
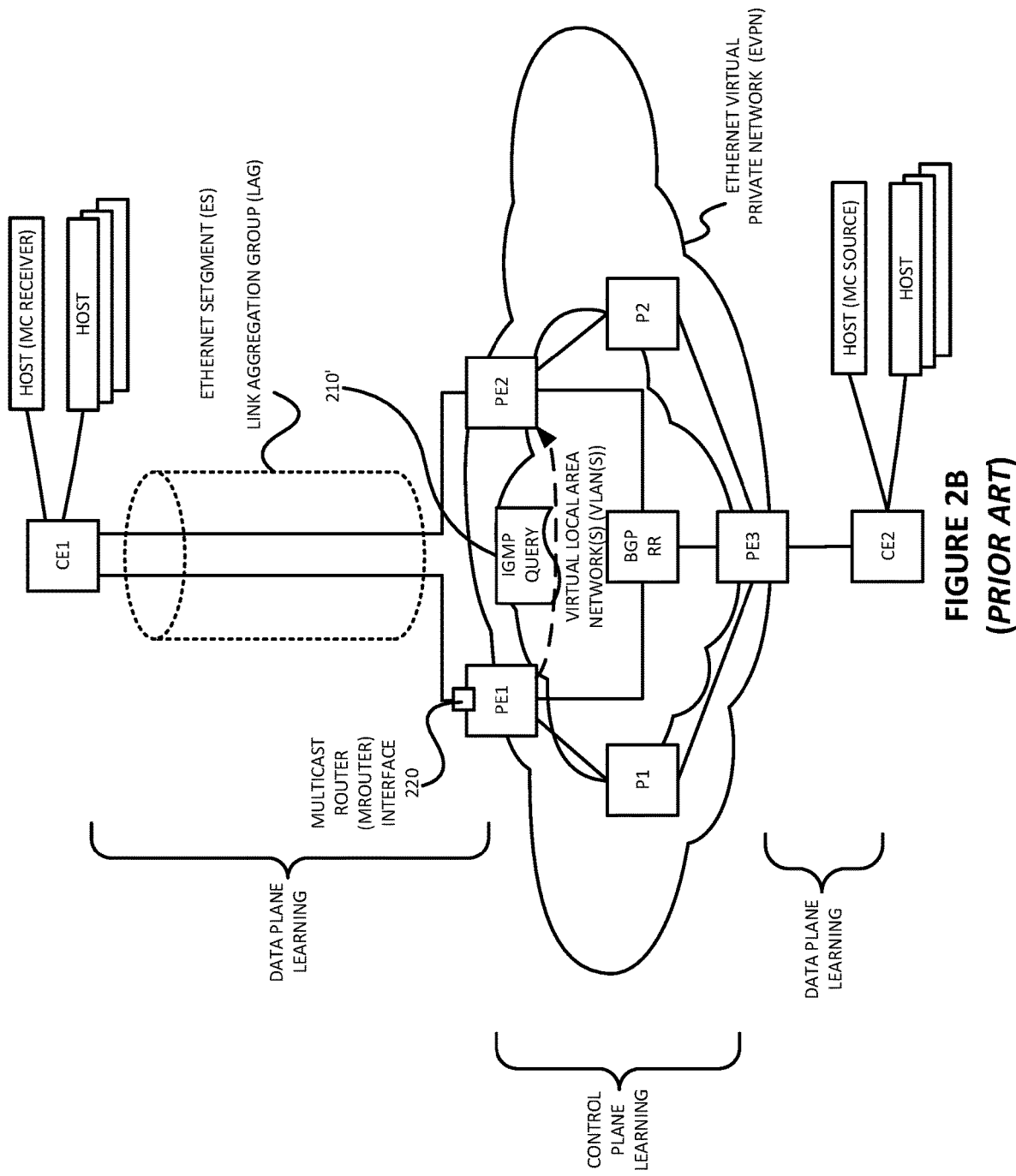
Figure 2C:
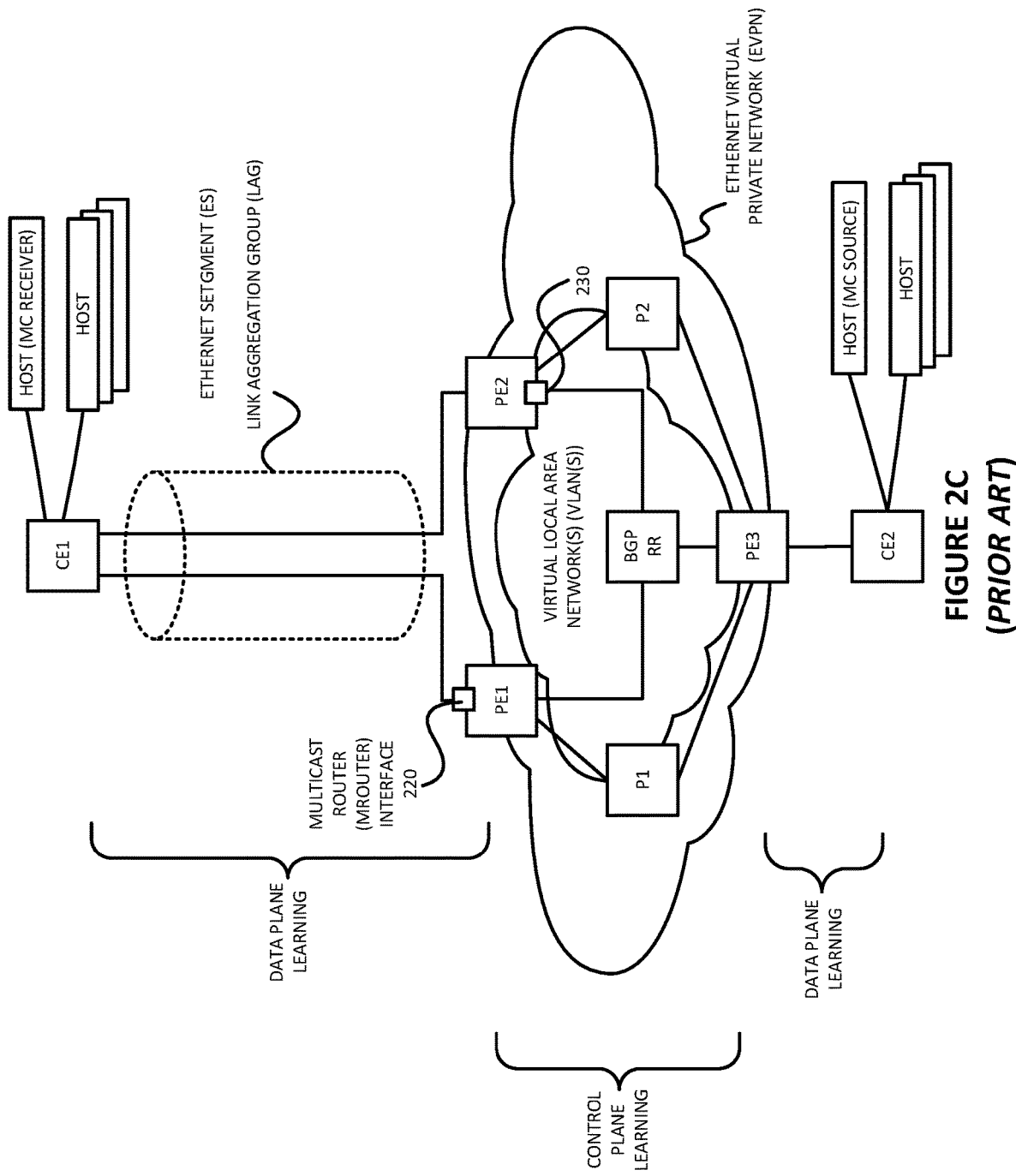
Figure 2D:
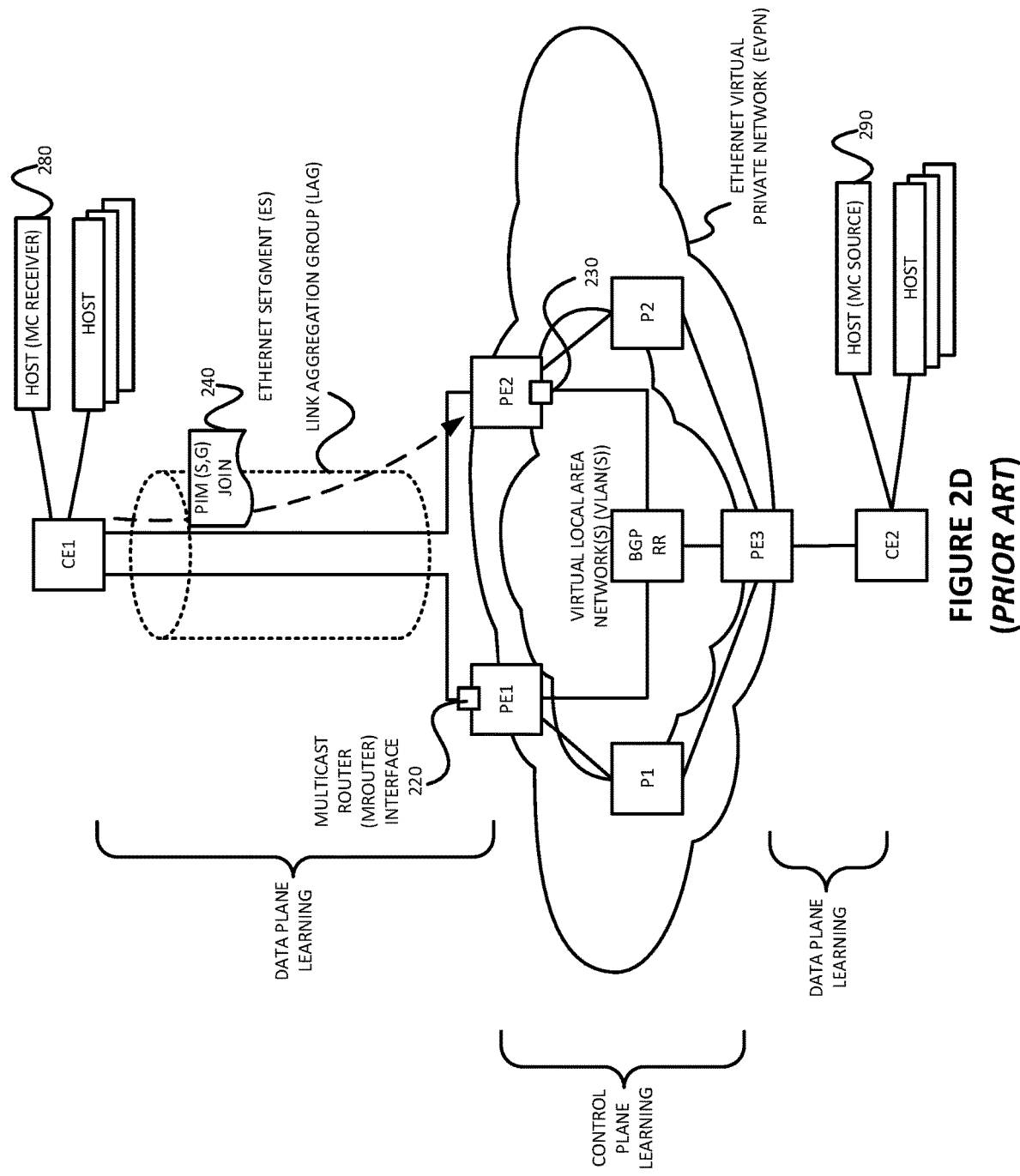
Figure 10A:
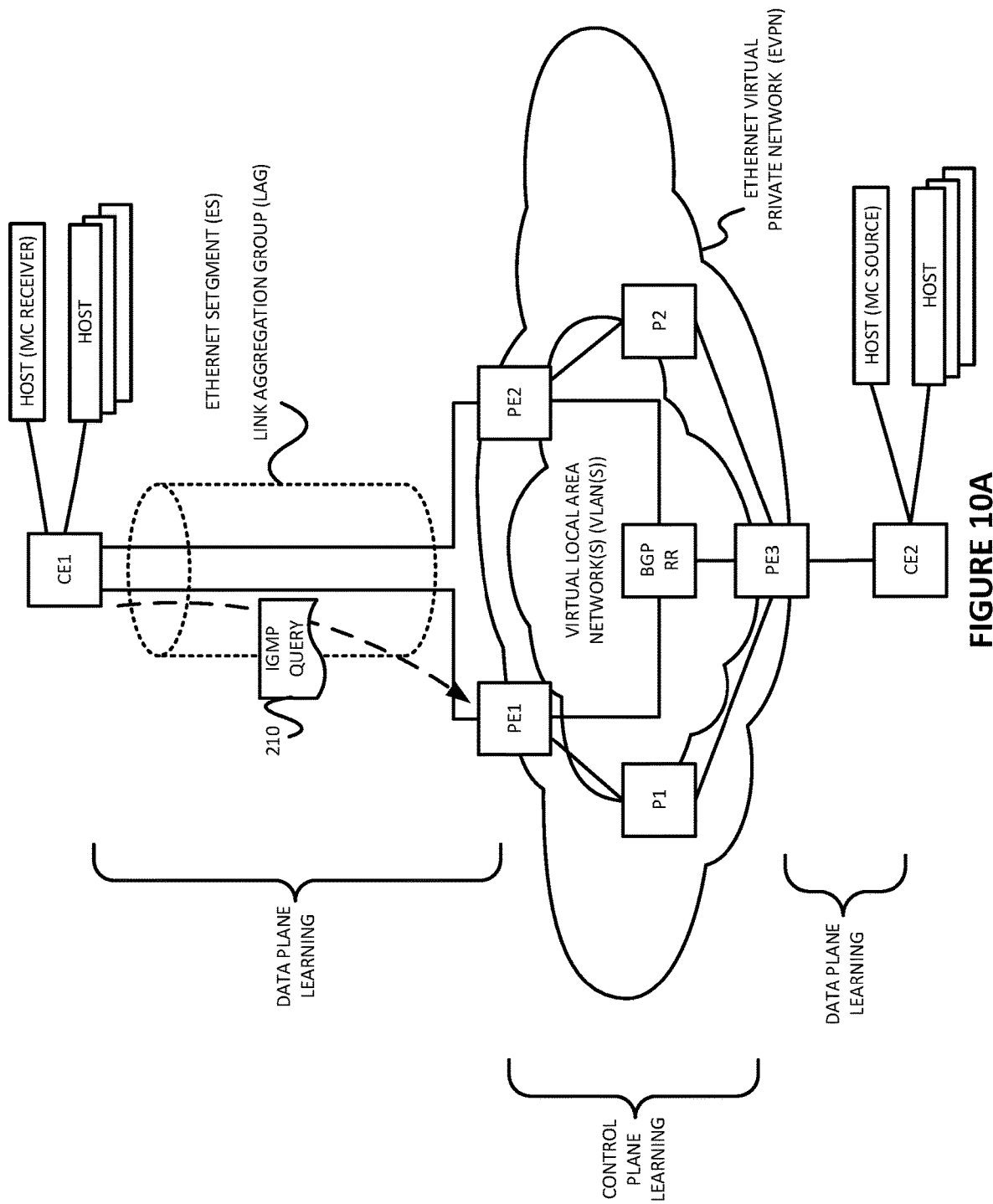
FIGS. 10A-10D illustrate example operations of the example method of FIG. 3 in the example network topology of FIG. 1.
Figure 10B:
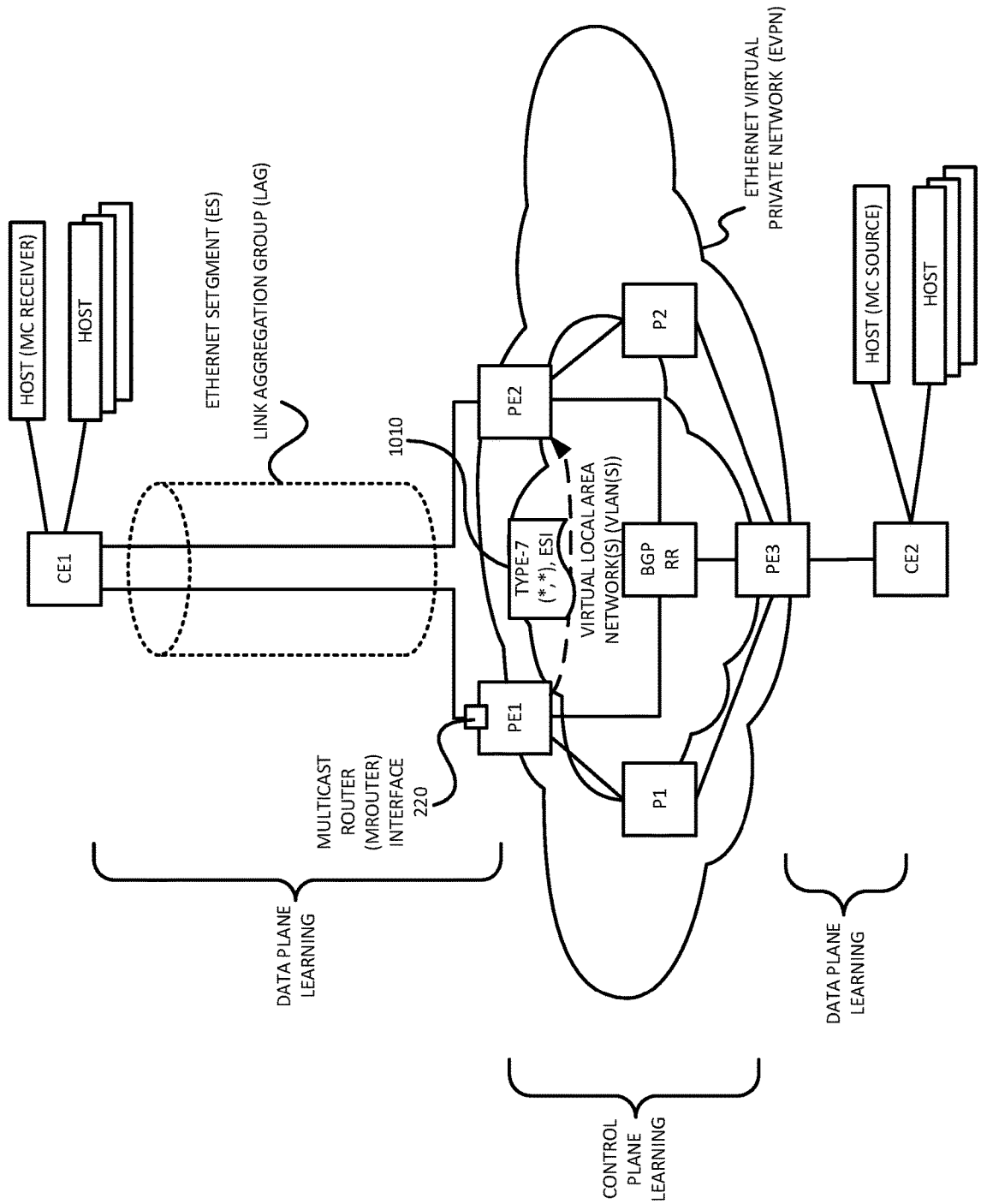
Figure 10C:
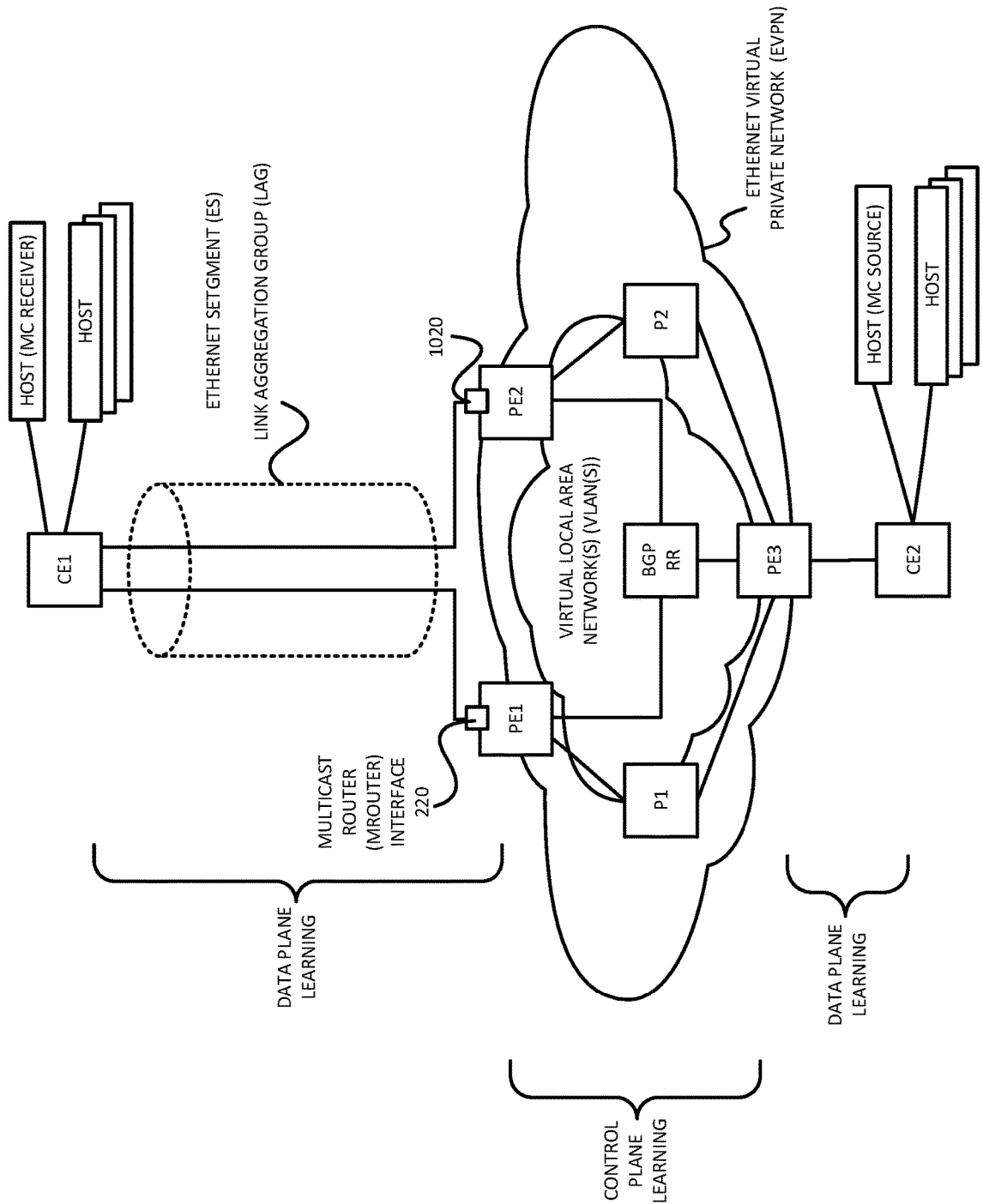
Figure 10D:
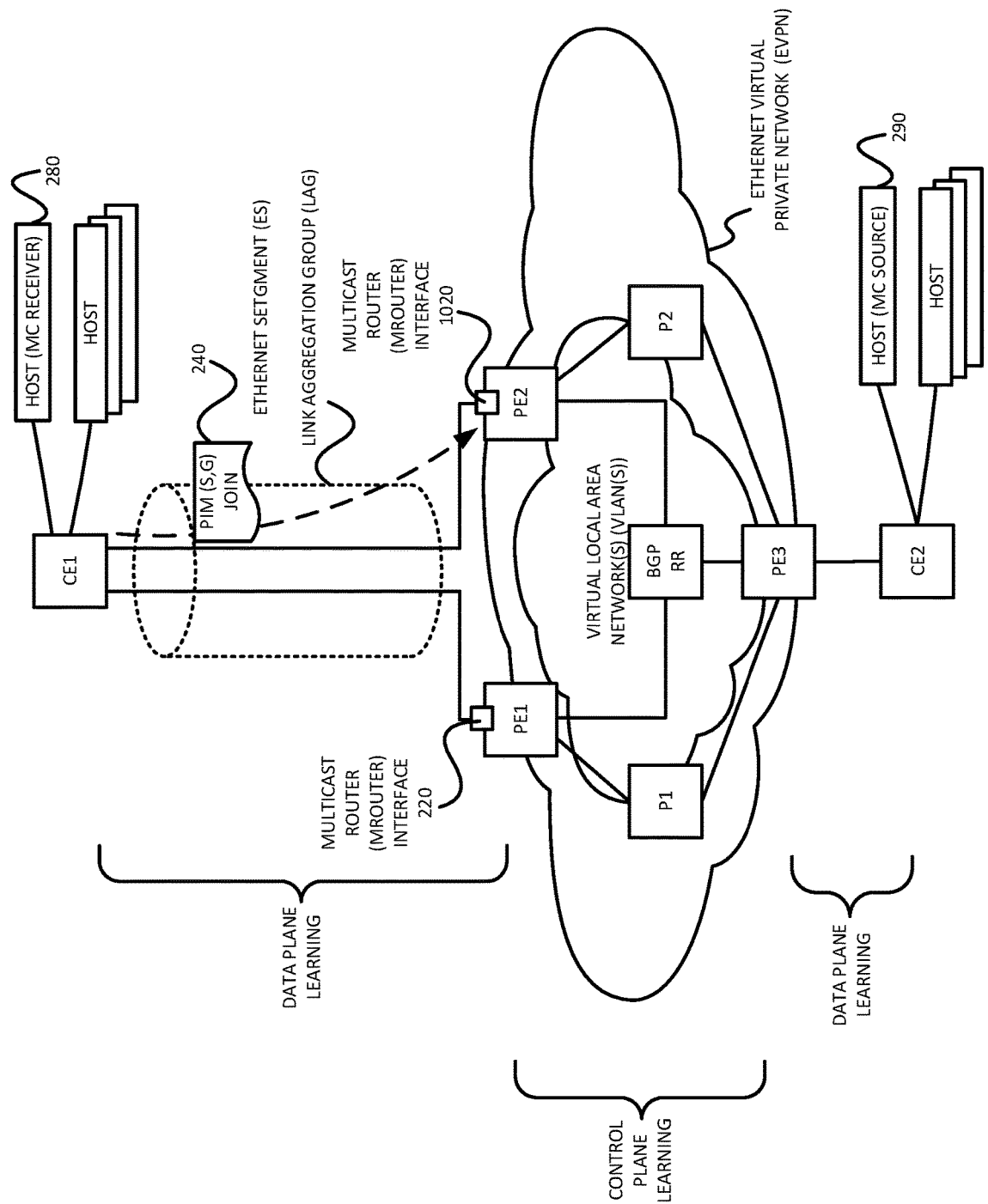

FIGS. 10A-10D illustrate example operations of an example implementation of method 300, in the context of an example environment such as that discussed with reference to FIG. 1. Referring first to FIG. 10A, when CE1 wants to send out an IGMP query, it is not known ahead of time which of the two links of the LAG it will use. That is, the link of the LAG to be used can be thought of as being non-deterministic. Suppose the IGMP query 210 is detected (snooped) by PE1 (but not by PE2) via a link of the LAG. (Recall, e.g., 310 of FIG. 3.) Referring to FIG. 10B, PE1 detects the IGMP query 210, and in response, PE1 marks the interface towards CE1 as an multicast router (mrouter) port 220. (Recall, e.g., 320 of FIG. 3.) Further, PE1 will originate a Type-7 (*,*) route for the ES in a BGP message 1010. Although this message 1010 may be provided to any PEs in the EVPN (e.g., PE2 and PE3) (not all shown in FIG. 10B), since the message 1010 carries an identifier of the ES, only those PEs belonging to the ES (e.g., PE2, but not PE3) will import the Type-7 (*,*) route. Referring to FIG. 10C, when PE2 receives the Type-7 (*,*) route for the ES, it will mark its L2 interface 1020 on the ES as an mrouter port and install appropriate routing and/or forwarding information. Finally, referring to FIG. 10D, suppose that CE1 wants to pull multicast traffic from within the VLAN fabric. For example, a host (multicast receiver) 280 coupled with CE1 may want to receive multicast packets from a host (multicast source) 290 coupled with CE2. Consequently, assume that CE1 sends a PIM (S,G) Join 240. Assume that the PIM (S,G) Join 240 is sent over the link to PE2. PE2 will add in its L3-multicast forwarding outgoing interface (OIF), the IRB-MVLAN interface 1030. Since the PE2's L2-interface towards CE1 was previously marked as an mrouter port 1020, PE2 will forward multicast group (G) traffic to CE1.

Note that there can be multiple MVLANs where the PEs will connect with an external multicast. Sometimes the PEs are also multihomed to firewall devices running PIM. In the absence of synchronization of the mrouter port (such as provided by example method 300), multicast traffic will not flow properly.

As can be appreciated from the foregoing, the example method 300 solves the problem discussed above with reference to FIGS. 2A-2D. (Compare FIGS. 10A-10D.)

§ 4.4 Refinements, Alternatives and Extensions

Although the example method 300 was described in the context of a device (CE) multihomed, via a bundle of Ethernet links, to two devices (PE1 and PE2) of a VLAN, it will also work with multihoming to more than two devices of a VLAN. In such generalized embodiments, active-active type multihoming may be thought of as all-active multihoming.

Although some example embodiments were described in the context of an EVPN-MPLS environment, example embodiments can be used in other environments, such as EVPN-VxLAN for example.

Although described in the context of active-active (or all-active) multihoming, example embodiments consistent with the present description are also useful in the context of a network having active-standby multihoming.

Figure 11:
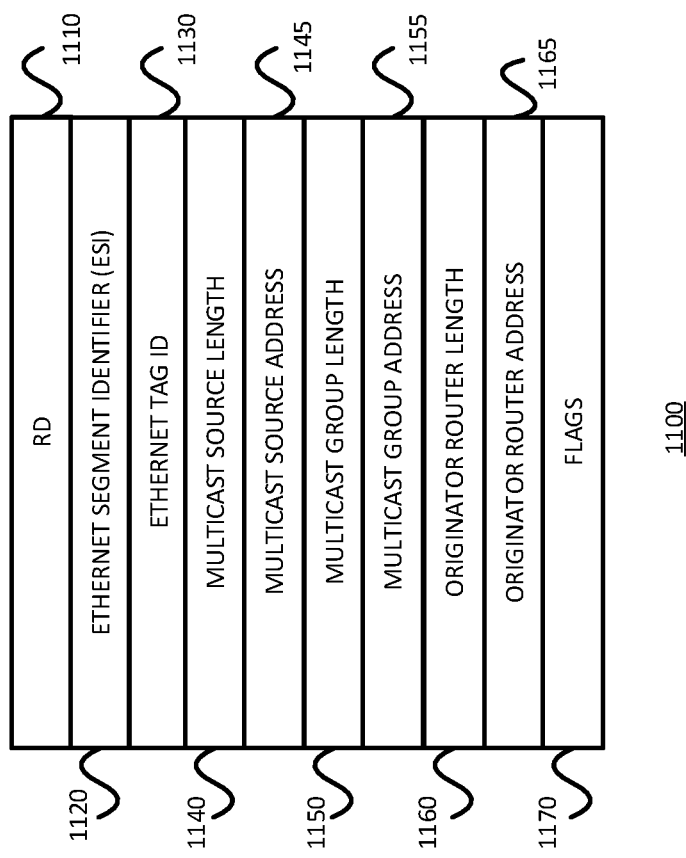
FIG. 11 illustrates an example Type-7 (*,*) packet format that may be used in the message of the example method of FIG. 3.

FIG. 11 illustrates an example Type-7 (*,*) packet format 1100 that may be used in the message. More specifically, it may be carried as an NLRI in a BGP message. The example packet format 1100 includes an (e.g., 8-octet) RD field 1110, an (e.g., 10-octet) ESI field 1120, an (e.g., 4-octet) Ethernet Tag ID field 1130, a (e.g., 1-octet) Multicast Source Length field 1140, a (e.g., variable length) Multicast Source Address field 1145, a (e.g., 1-octet) Multicast Group Length field 1150, a (e.g., variable length) Multicast Group Address field 1155, an (e.g., 1-octet) Originator Router Length field 1160, a (e.g., variable length) Originator Router Address field 1165 and a (e.g., 1-octet) Flags field 1170. The fields may be similar to those defined in § 7.2 of the Sajassi draft. However, the Multicast Source Address field 1145 may carry a zero(s), or some other information encoding that the Multicast Source is Any Source (*), and the Multicast Group Address field 1155 may carry a zero(s), or some other information encoding that the Multicast Group is Any Group (*). The ESI field 1120 will carry the ESI of the Ethernet segment over which one device (e.g., CE) is multihomed to at least two devices (e.g., PE1 and PE2) belonging to the EVPN. Naturally, other formats can be used to convey the foregoing information. That is, other format can be used to convey the mrouter port information of an ESI. If the Source, Group fields are (*,*), this indicates that the message is to be treated as a synchronizing message of the mrouter port.

Finally, note that when a PE detects that an ES-facing interface is no longer an mrouter port (e.g., due to the CE stopping multicast queries, e.g., for a predetermined time), the PE may withdraw the Type-7 (*,*) route (or otherwise communicate to the other PE(s) on the EVPN and the ES that it is withdrawing its mrouter port, so the other PE(s) should withdraw theirs too).

§ 4.5 Conclusions

As should be appreciated from the foregoing, example embodiments consistent with the present description provide port synchronization for multicast on an Ethernet segment (ES) in which a first device is multihomed to at least two devices of a VLAN.

What is claimed is:

1. A computer-implemented method for use in a first device belonging to an Ethernet virtual private network (EVPN) and an Ethernet segment (ES), the ES including a second device and a third device, the second device also belonging to the EVPN, the third device being multihomed to the first device and the second device via the ES, and the first and second devices having snooping enabled for multicast group messages, the computer-implemented method comprising:
    a) detecting, on a first interface of the first device, from the third device via the ES, a multicast query message, wherein the multicast query message is not detected by the second device via the ES;
    b) marking the first interface of the first device as a multicast router port;
    c) generating a message identifying the ES and including information encoding that the multicast query message was detected on the ES; and
    d) sending, via the EVPN, the message generated to the second device so that the second device will mark an interface, on the ES, with the third device, as a multicast router port.

2. The computer-implemented method of claim 1 wherein message generated is a sent via a border gateway protocol (BGP) message.

3. The computer-implemented method of claim 2 wherein the BGP message includes a Type-7 route for any multicast group and any multicast source.

4. The computer-implemented method of claim 2 wherein the BGP message includes a Type-7 (*,*) route.

5. The computer-implemented method of claim 1 wherein the message generated is sent to multiple devices belonging to the EVPN, and wherein only those of the multiple devices that also belong to the ES process the generated message.

6. The computer-implemented method of claim 1 wherein the first device and the second device are provider edge devices (PEs) in a service provider transport network.

7. The computer-implemented method of claim 1 wherein the first and second devices are access routers in a data center.

8. The computer-implemented method of claim 1 wherein the message is sent from the first device to the second device via a virtual local area network (VLAN) of the EVPN such that it is received on an interface of the second device that is not on the ES.

9. The computer-implemented method of claim 8 herein the third device is one of (A) a host device, (B) a router, and (C) a switch.

10. The computer-implemented method of claim 1, wherein the multicast query message is an Internet Group Management Protocol (IGMP) message.

11. The computer-implemented method of claim 1 wherein the multicast query message is a Multicast Listener Discover (MLD) message.

12. The computer-implemented method of claim 1 wherein the third device is multihomed to the first device and the second device via the ES in an all-active mode.

13. The computer-implemented method of claim 12 wherein the first device is a designated forwarder (DF).

14. The computer-implemented method of claim 12 wherein the third device is multihomed to the first device and the second device via a link aggregation group (LAG).

15. The computer-implemented method of claim 1 wherein data is sent from the third device, non-deterministically, to a selected one of the first device and the second device.

16. The computer-implemented method of claim 1 further comprising:
    e) receiving, on the multicast router port of the second device, a multicast group join message, specifying a multicast group G from the third device via the ES;
    f) receiving, on an interface of the second device facing the EVPN, multicast traffic for the multicast group G originated by a source device (S) for the multicast group G; and
    g) forwarding the received multicast traffic for the multicast group G from the second device to the third device via the ES.

17. The computer-implemented method of claim 1 wherein the EVPN uses multiprotocol label switching (MPLS) encapsulation.

18. The computer-implemented method of claim 1 wherein the EVPN uses Virtual Extensible Local Area Network (VxLAN) encapsulation.

19. A first device belonging to an Ethernet virtual private network (EVPN) and an Ethernet segment (ES), the ES including a second device and a third device, the second device also belonging to the EVPN, the third device being multihomed to the first device and the second device via the ES, and the first and second devices having snooping enabled for multicast group messages, the first device comprising:

a) at least one processor; and b) a storage device storing instructions which, when performed by the at least one processor, cause the first device to perform a method including 1) detecting, on a first interface of the first device, from the third device via the ES, a multicast query message, wherein the multicast query message is not detected by the second device via the ES, 2) marking the first interface of the first device as a multicast router port, 3) generating a message identifying the ES and including information encoding that the multicast query message was detected on the ES, and 4) sending, via the EVPN, the message generated to the second device so that the second device will mark an interface, on the ES, with the third device, as a multicast router port.

20. A non-transitory computer-readable storage medium provided in a first device belonging to an Ethernet virtual private network (EVPN) and an Ethernet segment (ES), the ES including a second device and a third device, the second device also belonging to the EVPN, the third device being multihomed to the first device and the second device via the ES, and the first and second devices having snooping enabled for multicast group messages, the non-transitory computer-readable storage medium storing processor-executable instructions which, when executed by at least one processor of the first device, cause the at least one processor to perform a method comprising:

1) detecting, on a first interface of the first device, from the third device via the ES, a multicast query message, wherein the multicast query message is not detected by the second device via the ES;

2) marking the first interface of the first device as a multicast router port;

3) generating a message identifying the ES and including information encoding that the multicast query message was detected on the ES; and 4) sending, via the EVPN, the message generated to the second device so that the second device will mark an interface, on the ES, with the third device, as a multicast router port.

* * * * *